(12) United States Patent
Tanner et al.

(10) Patent No.: US 10,956,899 B2
(45) Date of Patent: Mar. 23, 2021

(54) MECHANISM TO ALLOW THE USE OF DISPOSABLE CARDS ON A SYSTEM DESIGNED TO ACCEPT CARDS CONFORMING TO THE STANDARDS OF THE GLOBAL PAYMENTS INDUSTRY

(75) Inventors: Colin Tanner, Uxbridge (GB); Michael J. Cowen, London (GB); James D. Sinton, Leigh-on-Sea (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1824 days.

(21) Appl. No.: 13/372,907

(22) Filed: Feb. 14, 2012

(65) Prior Publication Data

US 2013/0212025 A1 Aug. 15, 2013

(51) Int. Cl.
G06Q 40/00 (2012.01)
G06Q 20/34 (2012.01)
G06Q 20/40 (2012.01)

(52) U.S. Cl.
CPC ......... G06Q 20/348 (2013.01); G06Q 20/401 (2013.01)

(58) Field of Classification Search
CPC .................................................. G06Q 20/348
USPC .......................................................... 705/44
See application file for complete search history.

(56) References Cited

U.S. PATENT DOCUMENTS

| | | | |
|---|---|---|---|
| 7,374,082 B2 | 5/2008 | Van de Velde et al. | |
| 7,657,486 B2 | 2/2010 | Smets et al. | |
| 7,681,788 B2 | 7/2010 | Van de Velde et al. | |
| 7,828,204 B2 | 11/2010 | Fiebiger et al. | |
| 8,196,818 B2 | 6/2012 | Van de Velde et al. | |
| 8,341,084 B2 | 12/2012 | Cowen | |
| 8,556,170 B2 | 10/2013 | Fiebiger et al. | |
| 8,584,936 B2 | 11/2013 | Fiebiger et al. | |
| 8,775,310 B2 | 7/2014 | Tanner et al. | |
| 8,949,152 B2 | 2/2015 | Cowen | |

(Continued)

FOREIGN PATENT DOCUMENTS

FR 2815445 A1 4/2002
TW 200842721 A 11/2008

(Continued)

OTHER PUBLICATIONS

Authorized Officer Lee W Young, USPTO as ISA, International Search Report and Written Opinion, PCT/US13/26165, dated May 6, 2013, pp. 1-7.

(Continued)

*Primary Examiner* — Bruce I Ebersman
*Assistant Examiner* — John A Anderson
(74) *Attorney, Agent, or Firm* — Otterstedt, Wallace & Kammer, LLP

(57) ABSTRACT

At a terminal assembly associated with a physical access point, payment device data is obtained from a reduced-functionality payment device, and the data is identified as emanating from such a device. In response, the payment device data emanating from the reduced-functionality payment device is converted into an authorization request or an access request, of a format consistent with full-functionality payment devices. The authorization request or access request is dispatched into a payment infrastructure which is configured to handle same, but is not configured to handle the reduced-functionality payment device.

19 Claims, 11 Drawing Sheets

(56) References Cited

U.S. PATENT DOCUMENTS

| | | |
|---|---|---|
| 9,098,851 B2 | 8/2015 | Cowen |
| 2003/0233327 A1 | 12/2003 | Keresman, III et al. |
| 2004/0064302 A1 | 4/2004 | Cunin |
| 2005/0156026 A1 | 7/2005 | Ghosh et al. |
| 2006/0291455 A1* | 12/2006 | Katz et al. ............ 370/355 |
| 2007/0026139 A1 | 11/2007 | Fiebiger et al. |
| 2007/0257107 A1 | 11/2007 | Madani |
| 2008/0033880 A1 | 2/2008 | Fiebiger et al. |
| 2008/0156873 A1 | 7/2008 | Wilhelm et al. |
| 2009/0017764 A1 | 1/2009 | Bonner et al. |
| 2009/0103730 A1 | 4/2009 | Ward et al. |
| 2009/0210299 A1 | 8/2009 | Cowen |
| 2010/0005168 A1 | 1/2010 | Williams et al. |
| 2010/0252624 A1 | 10/2010 | Van de Velde et al. |
| 2011/0047019 A1 | 2/2011 | Cervenka et al. |
| 2011/0166914 A1* | 7/2011 | Dixon ............ G06Q 20/045 705/13 |
| 2011/0215159 A1* | 9/2011 | Jain ............ 235/492 |
| 2012/0011062 A1 | 1/2012 | Baker |
| 2012/0011070 A1 | 1/2012 | Ward |
| 2012/0143703 A1 | 6/2012 | Wall et al. |
| 2012/0173423 A1 | 7/2012 | Burdett |

FOREIGN PATENT DOCUMENTS

| | | |
|---|---|---|
| WO | WO2001/037199 A1 | 5/2001 |
| WO | Wo2004029860 A1 | 4/2004 |

OTHER PUBLICATIONS

Ouri Guivol, Supplementary European Search Report, Application EP 13 74 9768, European Patent Office, dated Sep. 23, 2015, pp. 1-8.

AN 073120 mifare Ultralight Features and Hints Rev 2.0 Dec. 18, 2006 Application Note pp. 1-21.

Topaz Low-Cost 13.56 MHz Near Field Communications (NFC) Radio Frequency Identification (RFID) Read/Write IC Part No. IRT5011W, Rev. 1.1 May 2006 pp. 1-5, Innovision Research & Technology PLC.

AN 073121 mifare Ultralight Features and Hints Rev 2.1 Aug. 2007 Application Note pp. 1-21.

Intellectual Property Office of Taiwan Republic of China, Mar. 21, 2016 office action, (English Translation) pp. 1-8, ROC Counterpart Patent Application No. 102105698.

Chilean Instituto Nacional de Propiedad Industrial (INAPI), Expert Examiner Response, Chilean counterpart application 201402185, dated Dec. 15, 2016, English translation pp. 1-6.

Anonymous: "ISO 8583—Wikipedia", Feb. 8, 2012 (Feb. 8, 2012), XP055611757, Retrieved from the Internet: URL:https://en.wikipedia.org/w/index.php? title=ISO 8583&oldid=4 75703878 [retrieved on Aug. 8, 2019], pp. 1-13.

Raymaekers, Jens et al., Summons to attend oral proceedings pursuant to Rule 115(1) EPC, counterpart EP Application 13749768.1-1217 / 12815361, Oct. 7, 2019, pp. 1-9.

* cited by examiner

MECHANISM TO ALLOW THE USE OF DISPOSABLE CARDS ON A SYSTEM DESIGNED TO ACCEPT CARDS CONFORMING TO THE STANDARDS OF THE GLOBAL PAYMENTS INDUSTRY

FIELD OF THE INVENTION

The present invention relates generally to the electronic and computer arts, and, more particularly, to apparatus and methods for electronic payment.

BACKGROUND OF THE INVENTION

There is an interest in employing cash alternatives in a variety of environments. Such cash alternatives can include, for example, payment devices such as payment cards and the like. Indeed, devices, such as electronic devices, and particularly electronic payment devices (for example, so-called "smart cards") may be useful for a variety of payment and other applications. Cash alternatives are sometimes used within an infrastructure, such as a transit infrastructure (e.g., subway, metro, or underground; bus system). Some such infrastructures are designed to accept cards conforming to the standards of the global payments industry.

One such standard is set forth in the EMV standards, discussed further below, which define the interaction between smart cards and smart card processing devices for financial transactions. There are standards based on ISO/IEC 7816 for contact cards, and standards based on ISO/IEC 14443 for contactless cards. MasterCard PayPass® is an EMV compatible, "contactless" payment feature based on the ISO/IEC 14443 standard that provides cardholders with a way to pay by tapping a payment card or other payment device, such as a phone or key fob, on a point-of-sale terminal reader. MasterCard PayPass® includes the MasterCard PayPass® M/Chip and MasterCard PayPass® Mag Stripe specifications. The latter is one example of a specification that allows chip payments (in particular, contactless chip payments) to use authorization networks (proprietary and shared) that presently support magnetic stripe authorizations for credit or debit applications. PayPass® is a registered mark of, and the PayPass® specifications are available from, MasterCard International Incorporated of Purchase, N.Y., USA.

SUMMARY OF THE INVENTION

Principles of the invention provide a mechanism to allow the use of disposable cards on a system designed to accept cards confirming to the standards of the global payments industry. In one aspect, an exemplary method includes the steps of obtaining, at a terminal assembly associated with a physical access point, payment device data from a reduced-functionality payment device; identifying the payment device data as emanating from the reduced-functionality payment device; responsive to the identifying step, converting the payment device data emanating from the reduced-functionality payment device into one of an authorization request and an access request, the one of an authorization request and an access request being of a format consistent with full-functionality payment devices; and dispatching the one of an authorization request and an access request into a payment infrastructure which is configured to handle the one of an authorization request and an access request of the format consistent with the full-functionality payment devices, but is not configured to handle the reduced-functionality payment device.

In another aspect, a terminal assembly associated with a physical access point includes a memory, and at least one processor, coupled to the memory. The at least one processor is operative to carry out or otherwise facilitate any one, some, or all of the method steps described herein; for example, to obtain, at the terminal assembly associated with the physical access point, payment device data from a reduced-functionality payment device; identify the payment device data as emanating from the reduced-functionality payment device; responsive to the identifying, convert the payment device data emanating from the reduced-functionality payment device into one of an authorization request and an access request, the one of an authorization request and an access request being of a format consistent with full-functionality payment devices; and dispatch the one of an authorization request and an access request into a payment infrastructure which is configured to handle the one of an authorization request and an access request of the format consistent with the full-functionality payment devices, but is not configured to handle the reduced-functionality payment device.

Aspects of the invention contemplate the method(s) performed by one or more entities herein, as well as facilitating one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a tangible computer readable recordable storage medium with computer usable program code for performing the method steps indicated stored thereon in a non-transitory manner. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein.

One or more embodiments of the invention can provide substantial beneficial technical effects; for example:
  allows use of low-cost media, including industry-standard low-cost media
  does not require operator to maintain proprietary or legacy solution(s)
  facilitates wider adoption of electronic payment without need to maintain two separate infrastructures (e.g., an old proprietary infrastructure and a modern infrastructure using EMV or the like); inexpensive media can be used within the same infrastructure which also accepts EMV These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
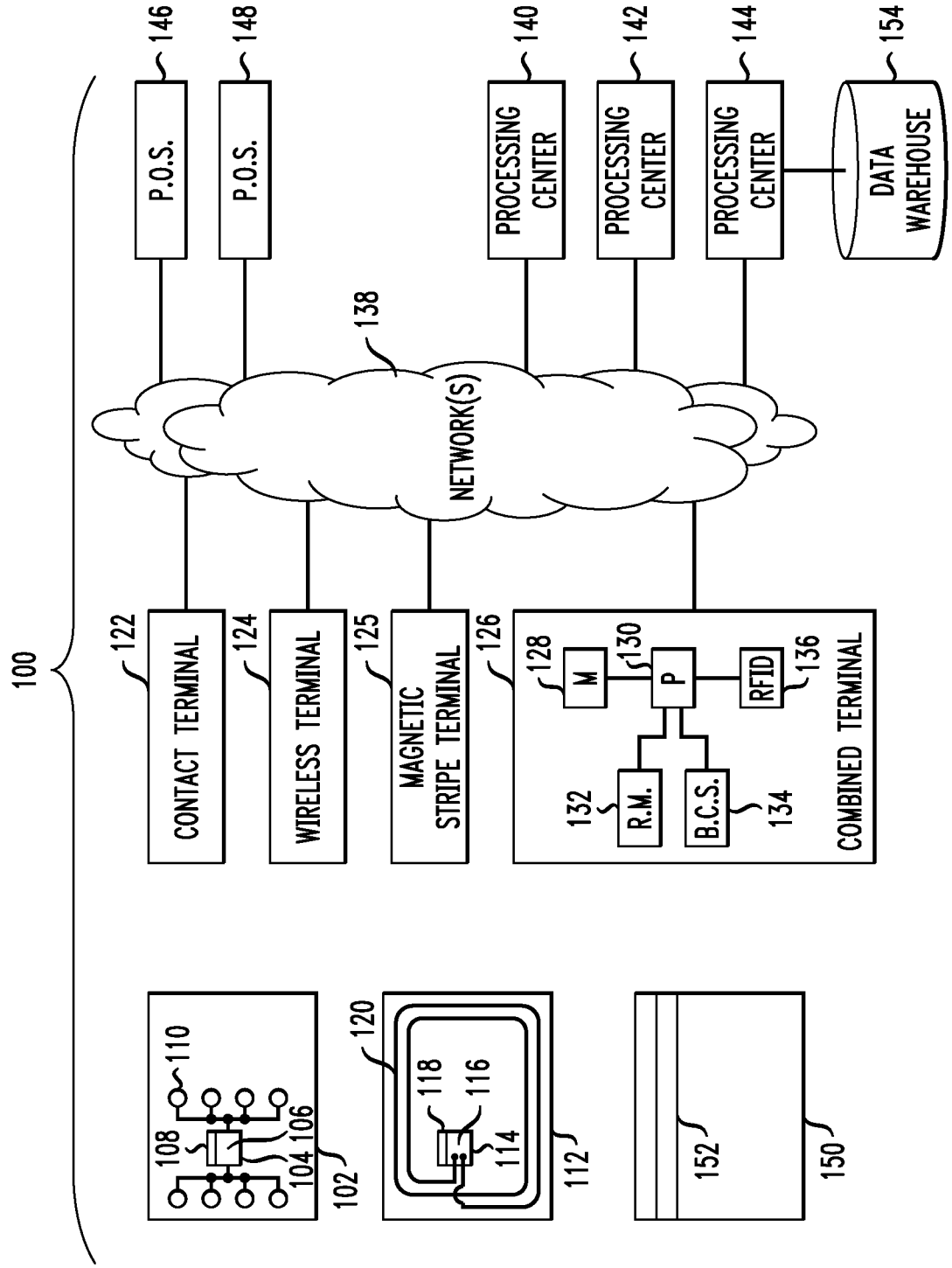
FIG. 1 shows an example of a system and various components thereof that can implement techniques of the invention.

Attention should now be given to FIG. 1, which depicts an exemplary embodiment of a system 100, according to an aspect of the invention, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 per se may function with other types of devices in lieu of or in addition to "smart" or "chip" cards 102, 112; for example, a conventional card 150 having a magnetic stripe 152. Furthermore, an appropriately configured cellular telephone handset, personal digital assistant (PDA), and the like can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used to implement the present invention is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

It should be noted that the skilled artisan will be familiar with the EMV specifications. Nevertheless, out of an abundance of caution, the following documents are expressly incorporated herein by reference in their entirety for all purposes (the same are published by EMVCo and available on EMVCo's web site):

EMV Integrated Circuit Card Specifications for Payment Systems Book 1 Application Independent ICC to Terminal Interface Requirements Version 4.2 June 2008

EMV Integrated Circuit Card Specifications for Payment Systems Book 2 Security and Key Management Version 4.2 June 2008

EMV Integrated Circuit Card Specifications for Payment Systems Book 3 Application Specification Version 4.2 June 2008

EMV Integrated Circuit Card Specifications for Payment Systems Book 4 Cardholder, Attendant, and Acquirer Interface Requirements Version 4.2 June 2008

EMV Integrated Circuit Card Specifications for Payment Systems Book 1 Application Independent ICC to Terminal Interface Requirements Version 4.3 November 2011

EMV Integrated Circuit Card Specifications for Payment Systems Book 2 Security and Key Management Version 4.3 November 2011

EMV Integrated Circuit Card Specifications for Payment Systems Book 3 Application Specification Version 4.3 November 2011

EMV Integrated Circuit Card Specifications for Payment Systems Book 4 Cardholder, Attendant, and Acquirer Interface Requirements Version 4.3 November 2011

EMV Common Payment Application Specification (CPA) v. 1.0 March 2008

EMV Card Personalization Specification

EMV Contactless Specifications for Payment Systems, including Book A: Architecture and General Requirements March 2011; Book B: Entry Point March 2011; Books C [C-1, C-2, C-3, C-4]: Kernel Specifications March 2011; Book D: Contactless Communication Protocol March 2011; EMV Contactless Specs v2.1 Disposition of Comments March 2011

EMVCo Mobile Contactless—EMV Profiles of GlobalPlatform UICC Configuration v. 1.0 December 2010

EMV Contactless Mobile Payment—Application Activation User Interface v. 1.0 December 2010

All Specification Bulletins published from time to time to change and/or clarify the above The skilled artisan will also be familiar with the MasterCard® PayPass™ specifications, available under license from MasterCard International Incorporated of Purchase, N.Y., USA (marks of MasterCard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 3 below). More than one network could be employed to connect different elements of the system. For example, a local area network (LAN) could connect a terminal to a local server or other computer at a retail establishment, in a transit station, etc. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 142. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

Figure 2:
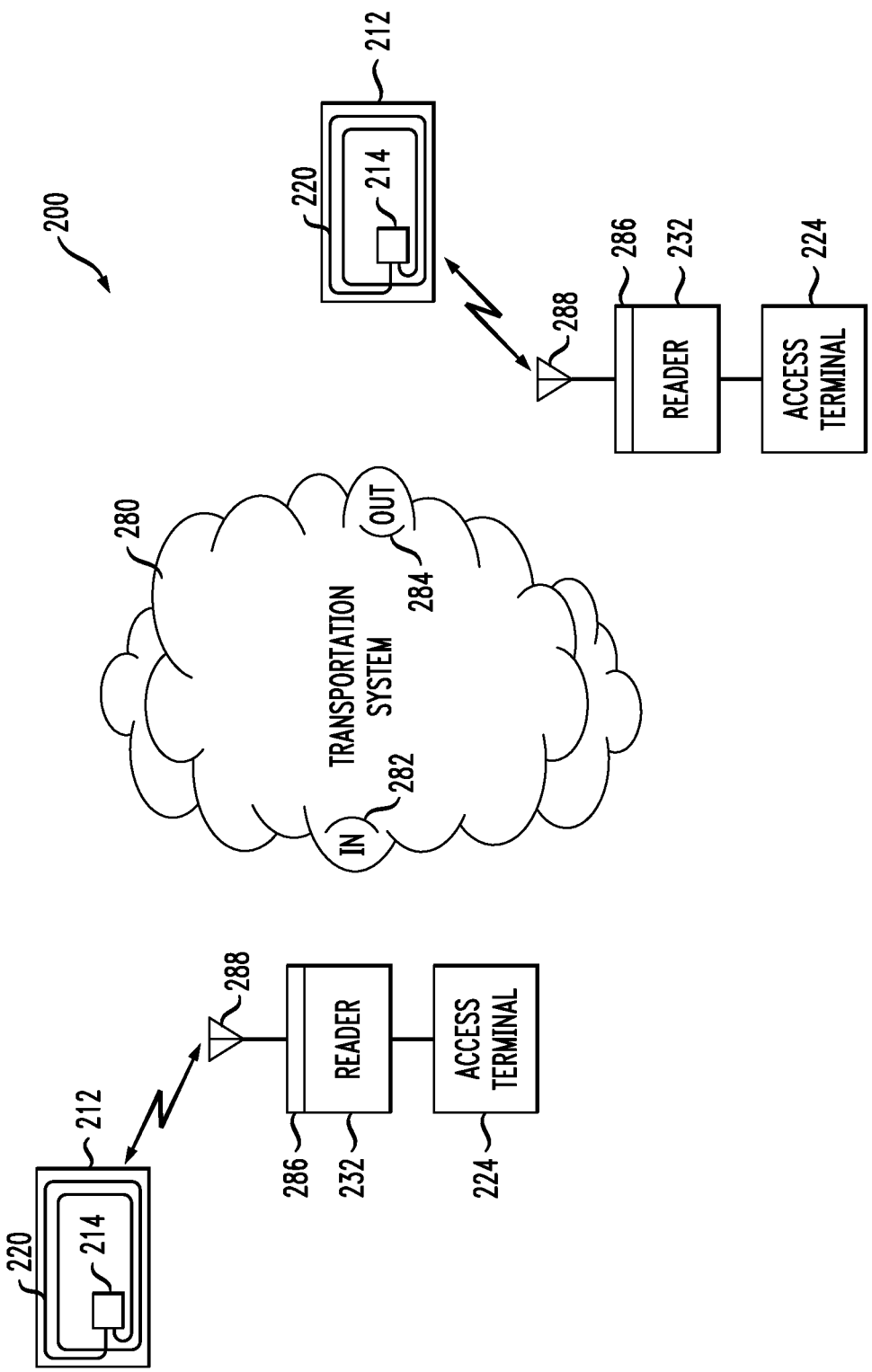
FIG. 2 shows one specific non-limiting exemplary application of techniques of the present invention to a transportation system.

Attention should now be given to FIG. 2, which depicts an exemplary system 200 applying certain techniques of the invention to an exemplary transportation system 280. It is to be understood that this is illustrative of one of many possible applications of techniques of the present invention. Passenger access to system 280 is controlled by portable payment devices 212 and terminals 224. Elements in FIG. 2 similar to those in FIG. 1 have received the same reference character incremented by 100 and will not be described in detail again. Thus, devices 212, chips 214, antennas 220, terminals 224 and reader modules 232 are similar to those discussed above with respect to FIG. 1 (but the system 200 can also work with reduced functionality payment devices, as described elsewhere herein). The reader modules can include communications circuitry 286 and antennas 288 for wireless communications with antennas 220. Contact, bar code, or magnetic stripe solutions could also be employed, in addition to or in lieu of contactless solutions.

When a passenger wishes to enter system 280, he or she causes device 212 to communicate with access terminal 224 (for example by touching or tapping at a designated location, or holding in close proximity to such location). As used herein, "communicate with" is intended to cover both one and two-way cases, for example, a two-way communication scenario with a terminal and chip card, as well as a one-way scenario wherein a terminal simply reads a magnetic stripe card. The touching, tapping, or other communication may result, for example, in recordation of the passenger's activity to enable subsequent calculation of a fare owed. A turnstile or other entrance barrier may then permit passage through entrance 282 to trains or other modes of transportation. In some cases, a passenger must again present device 212 when exiting at exit 284, as a fare may depend on a distance traveled.

Embodiments of the invention also contemplate additional method steps of opening a fare gate (for example, allowing a turnstile to turn) when appropriate; for example, when the card or other device is presented upon exit and/or entrance.

It should be noted at this point that the complete disclosures of the following United States Patent Application Publications are expressly incorporated herein by reference in their entireties for all purposes:

US 2007/026139 of Fiebiger et al., published 15 Nov. 2007, and entitled "Techniques for Authorization of Usage of a Payment Device"

US 2008/0033880 of Fiebiger et al., published 7 Feb. 2008, and entitled "Techniques for Authorization of Usage of a Payment Device"

US 2008/0156873 of Wilhelm et al., published Jul. 3, 2008, and entitled "Method And System For Using Contactless Payment Cards In A Transit System"

US 2009/0210299 of Michael J. Cowen, published Aug. 20, 2009, and entitled "Method and Apparatus for Simplifying the Handling of Complex Payment Transactions"

Figure 3:
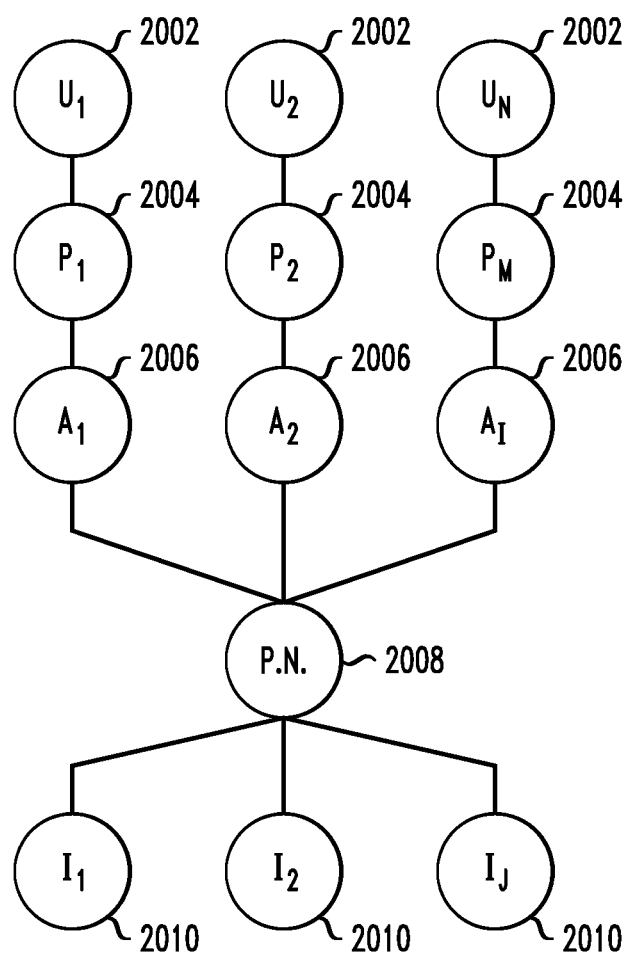
FIG. 3 depicts an exemplary inter-relationship between and among: (i) a payment network configured to facilitate transactions between multiple issuers and multiple acquirers, (ii) a plurality of users, (iii) a plurality of merchants, (iv) a plurality of acquirers, and (v) a plurality of issuers.

With reference to FIG. 3, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

It will be appreciated that the network 2008 shown in FIG. 2 is an example of a payment network configured to facilitate transactions between multiple issuers and multiple acquirers, which may be thought of as an "open" system. Some embodiments of the invention may be employed with other kinds of payment networks, for example, proprietary or closed payments networks with only a single issuer and acquirer.

Messages within a network such as network 138 and/or network 2008, may, in at least some instances, conform to the International Organization for Standardization (ISO) Standard 8583, *Financial transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)

ISO 8583 Part 2: Application and registration procedures for Institution Identification Codes (IIC) (1998)

ISO 8583 Part 3: Maintenance procedures for messages, data elements and code values (2003)

Figure 4:
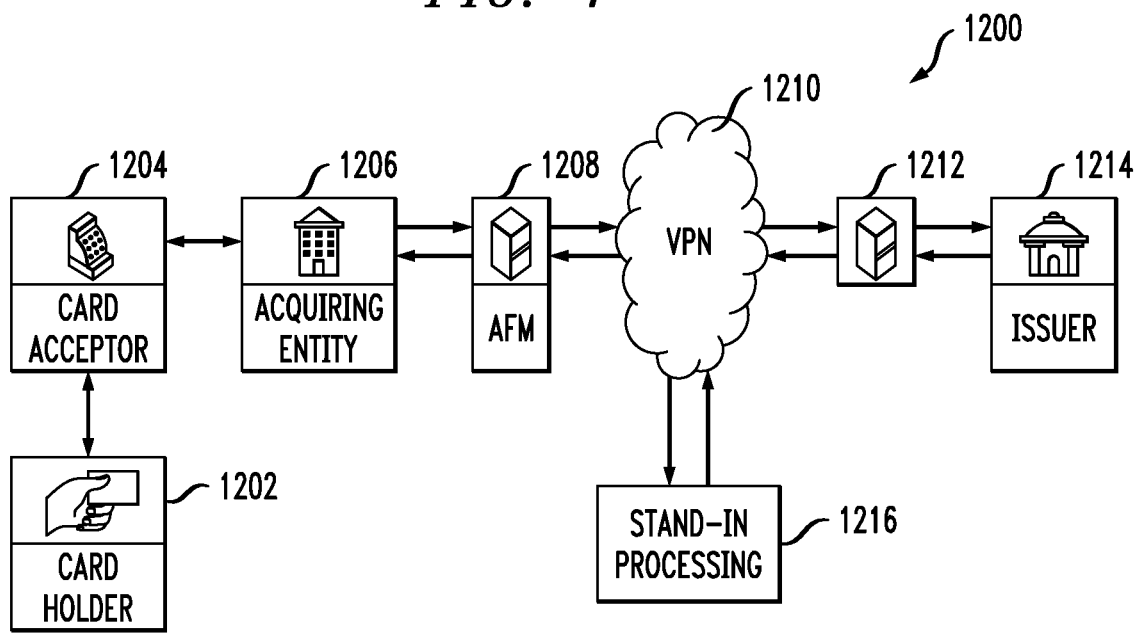
FIG. 4 shows initial and periodic authorization flow in a system that can implement techniques of the present invention.

Attention should now be given to FIG. 4, which is a block diagram 1200 of one possible specific exemplary system which can employ one or more techniques of the invention, also depicting (via the arrows) certain exemplary data flows. Note that elements 1202, 1204, 1206, 1210, and 1214 in FIGS. 4 and 5 generally correspond to elements 2002, 2004, 2006, 2008, and 2010, respectively, in FIG. 3. A request may originate from a merchant and/or acquiring entity (for example the bank holding the merchant's account), and may traverse the payment network (in this case a VPN 1210 to be discussed below) to the issuer. The issuer 1214 then sends a response (or a stand-in processor 1216 sends it on behalf of the issuer) back through the payment network, to the merchant and/or acquiring entity. The request and response may employ standard formats (although the contents are not necessarily "standard").

As shown at 1202, the holder of a card or other payment device interacts with a terminal at a facility of a card acceptor 1204, corresponding, e.g., to terminals and points of sale as described with respect to FIG. 1 or fare gates as described with respect to FIG. 2. The card acceptor sends transaction information to an acquiring entity 1206, for example, via a network such as described in FIG. 1. By way of example and not limitation, an acquiring entity could include an acquirer or other entity responsible for the acquired transaction, whether they are referred to in common use by artisans skilled in the electronic payment arts as an "acquirer" or an "acquiring processor," and the like (the acquiring entity can also be referred to as a consolidator). An active file manager (AFM) 1208 can be provided between acquiring entity 1206 and a telecommunications network such as VPN 1210 (which can be, for example, a payment processing network). The AFM 1208 can be located in a variety of places, e.g., at the acquiring entity's facility, and could be operated by, e.g., an acquirer. Further, AFM 1208 could reside on the same machine as a conventional front end communications processor such as a MASTERCARD INTERFACE PROCESSOR™ or MIP™ processor (trademarks of MasterCard International, Inc. of Purchase, N.Y.), or could reside on a separate machine interfacing with such a conventional front end processor, which then interfaced with network 1210. In summary, manager 1208 can be connected to network 1210 for authorization processing, but as noted, can be located in a variety of places. Interaction with issuer 1214 may not be at the same time as the payment device interacts with a terminal.

Another conventional front-end communications processor 1212, such as a MIP™ processor, can be located, e.g., at the facility of an issuer 1214 to provide access to the aforementioned VPN 1210. Of course, there may be a plurality of similarly-equipped issuer, and other, facilities.

Figure 5:
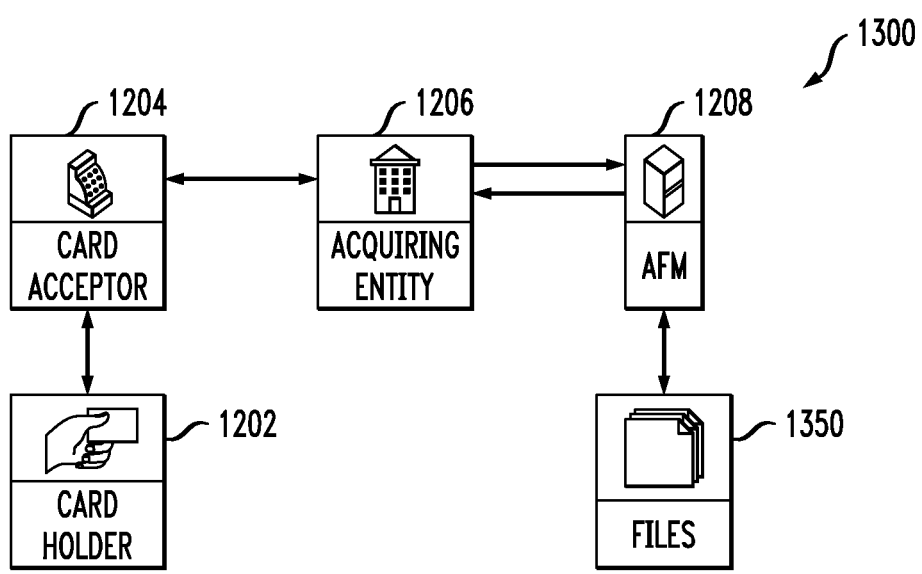
FIG. 5 shows file processing flow in a system that can implement techniques of the present invention.

FIG. 5 shows a block diagram 1300 of certain optional features of system 1200, which can be configured to implement a file processing flow. Items similar to those in FIG. 4 have received the same reference character and will not be described again. The arrows are for convenience in depicting the file processing flow. In block diagram 1300, Active File Manager 1208 is provided with an appropriate file structure 1350 (in some instances, structure 1350 may be a list or "constructed file"). In one or more embodiments, the AFM (Active File Manager) has an AFL (Active File List) that is a constructed file of both positive and negative accounts. That is, it is a list of all accounts active in the transit (or other) system, and potentially also drawing upon lists from other sources such as the International Hot Card Lists from MasterCard, Visa, and the like.

In one specific example, the processor 1212 is a MIP™ processor, and the VPN 1210 is a telecommunications network providing MASTERCARD BANKNET® telecommunications network services (registered trademark of MasterCard International, Inc. of Purchase, N.Y.).

Further non-limiting details regarding exemplary files in file structure 1350 can be found in the aforementioned US 2008/0033880.

Figure 6:
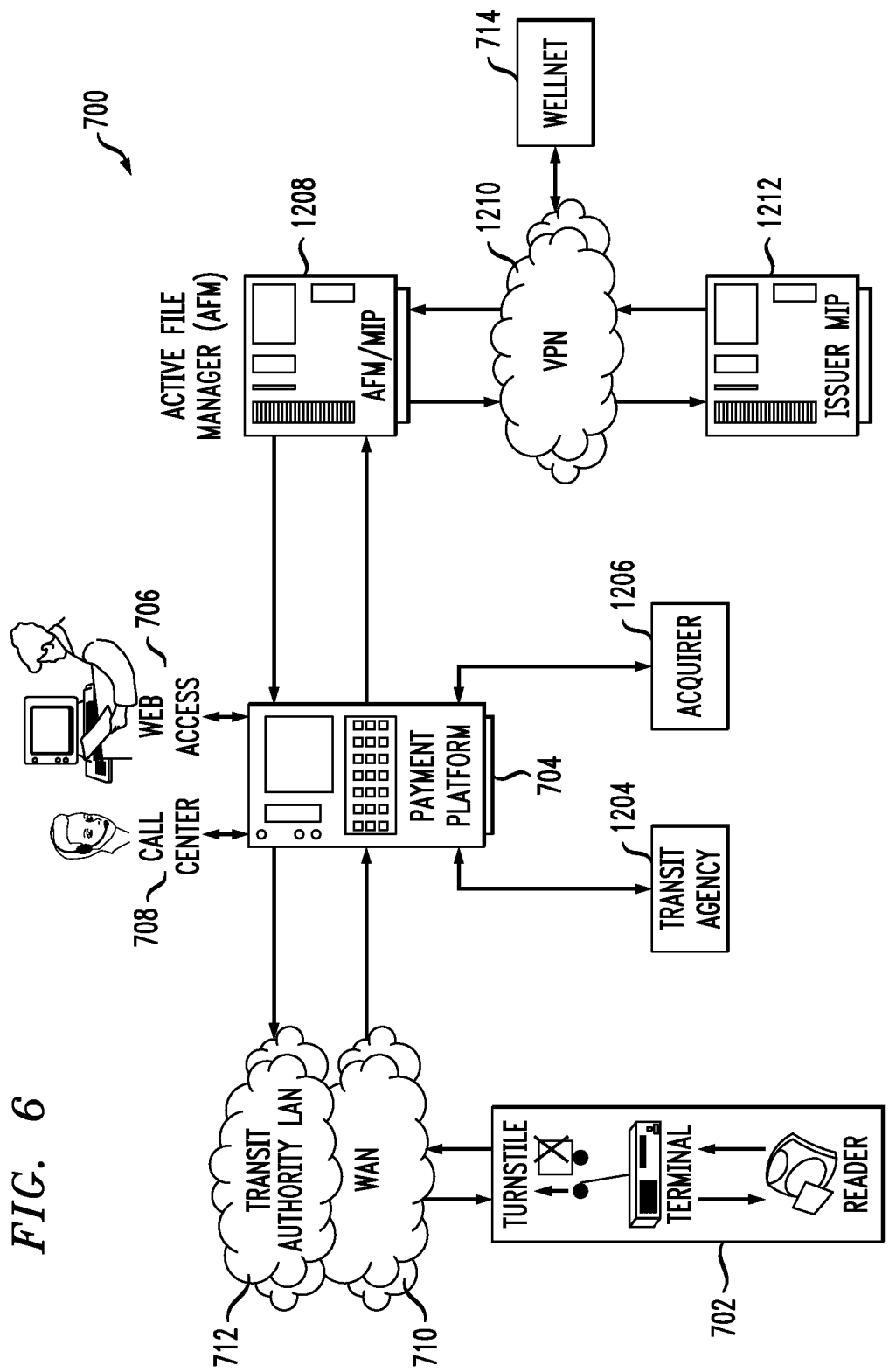
FIG. 6 is a system diagram of an exemplary transit solution that can implement techniques of the present invention.

Attention should now be given to FIG. 6, which depicts an exemplary detailed architecture for an exemplary automatic fare collection (AFC) solution 700. The architecture is similar to that of FIGS. 4 and 5, but more detailed, and items similar to those in FIGS. 4 and 5 have received the same reference character. In general terms, three significant components of the system are the fare gate assembly (turnstile, reader and terminal) 702, payment platform 704, and AFM 1208. Platform 704 may optionally be in communication with assembly 702, for example, via WAN 710 and/or LAN 712. AFM 1208 may also be in communication with platform 704, over a high speed communications network, and the components may be cooperatively configured to carry out one or more method steps disclosed herein. In one or more embodiments, the connection between AFM 1208 and platform 704 can be accomplished via a gigabit LAN connection.

AFM 1208 functions as a decision maker, going through appropriate criteria and performing a check for people attempting to access the transit system. Platform 704 functions as a record keeper, gathering records of ridership; keeping records of accounts; performing reconciliations and other accounting functions; updating account balances based on activity; facilitating registration; and so on. Platform 704 may also handle web access 706 and assist customer representatives in call center 708.

Still referring to FIG. 6, assembly 702 is preferably connected to platform 704 via a wide area network (WAN) 710 and/or a local area network (LAN) 712, such as that of a transit authority. The platform 704 may support the fare gate (broadly understood to include subway turnstiles, bus fare boxes, and the like) and account transactions by maintaining account statuses and routing requests and responses for authorization. Among the tasks that may be managed by platform 704 are:

routing fare gate transaction activity between the transit agency reader/terminals and the AFM.

managing the necessary funding options for contactless device customers and their associated accounts.

hosting a transit agency-defined fare table and transfer rules (the fare rules may be defined by the transit agency, often as part of a public process, and the platform 704 typically does not change these rules; rather its function is to apply these rules to riders' accounts in the active account list (AAL)) and applying these fare and transfer rules to riders' accounts—since fare rules reside here, calculations of complex fares, for example, depending on distance traveled or discounts, may be performed here.

preparing the information to facilitate clearing messages between transit agencies, their acquirers, and the operator of a payment card network, such as MasterCard International Incorporated.

receiving and managing the transit agency's Restricted Card List (RCL).

supporting customer service functionalities such as web site 706 and call center 708 interfaces.

"Well net" 714 is a monitoring and parameter management system for MIPs 1208, 1212.

Appropriate communications links may be provided between the platform 704 and the transit agency 1204 and acquirer 1206.

In one or more embodiments, the payment platform 704 in FIG. 6 is a central server that performs various calculations. Payment platform 704 advantageously calculates fares, since this is typically where the fare rules reside. Payment platform 704 has access to ridership records and connectivity to the VPN 1210, and preferably has access to any additional data needed to determine fares, such as, for example, personal entitlements and/or discounts and/or subsidies associated with the card. Under a different architecture, the functionality of elements 704, 1208 could be combined in some instances.

By way of summary and provision of further detail, in many cases, a "transaction" using one or more inventive techniques will imply multiple (two or more) presentations of the card or other payment device, such as check-in and check-out, which determine the final fare. However, in some instances, only a single presentation is required, yet certain calculations (e.g., fare discount) may need to be performed to determine the amount due. In other instances, regardless of whether there are one or more presentations, no calculations are needed to determine the amount due.

As used herein, a "prepaid payment card" refers to a card or other device (e.g., appropriately configured cellular phone handset) configured according to a credit or debit card type payment system standard or specification (as opposed to a dedicated transit card or the like), wherein a stored balance associated with the card resides on a central or remote server, which prepaid payment card is designed for use in a conventional credit or debit card environment (for example, of the kind as shown in FIG. 3), and which is nearly universally accepted worldwide by merchants of all kinds. Such a card is also distinguished from a credit or debit card, in that it accesses a balance on a central server rather than a credit account or bank account. Furthermore, a debit card typically implies an established relationship with the cardholder (for example, an existing checking account) and is not anonymous, whereas a pre-paid card may (but need not be) purchased anonymously in a shop.

Transit cards typically are dedicated cards having a limited range of acceptance and are not widely accepted—they are typically accepted only by a single transit system in a single country, more typically in only a single city. In a few cases, transit cards may be accepted for low value purchases by a limited number of merchants that are connected with the transit system (e.g., vendors within the subway). The Hong Kong "Oyster" transit card can be used for low value purchases throughout the city but nowhere else. It is possible that evolving international standards may permit a transit card that can be used worldwide for transit, and possibly a small number of related low-value payments. In contradistinction, payment cards, such as prepaid payment cards employed in one or more embodiments of the invention, can typically be used worldwide and are near universally accepted by merchants of all kinds.

By way of additional background, the most common card-based forms of payment are general purpose cards, which are payment cards carrying logos that permit widespread usage of the cards within countries, regions or around the world. General purpose cards have different attributes depending on the type of accounts to which they are linked:

"pay later" cards, such as credit or charge cards, typically access a credit account that either requires payment of the full balance within a specified period (a charge card) or that permits the cardholder to carry a balance in a revolving credit account (a credit card);

"pay now" cards, such as debit cards, typically access a demand deposit or current account maintained by the cardholder; and "pay before" cards, such as prepaid or electronic purse cards, typically access a pool of value previously funded.

It should be noted that one or more embodiments are applicable in a transit environment. FIGS. 2 and 4-6 provide a non-limiting example of one of many possible transit environments in which embodiments of the invention might be employed. Furthermore, embodiments of the invention can be employed in a variety of contexts besides transit, such as, for example, theme parks, festivals, and events. Thus transportation system 280 could also represent a theme park; theater, stadium or other event venue; museum, or the like. In the broadest aspect, the entrance and exit could be the same or different physical locations. Even in a transport system, in some cases, this could be true; for example, a bus could have a single reader, terminal and entrance/exit door.

There is a trend in the public transport industry to move away from fare collection systems based on cash and/or proprietary and/or closed loop technology in favor of a system of fare collection that directly employs credit, debit and prepaid cards (especially contactless) issued by financial institutions. However a business requirement remains to serve customers who do not have such a card and who wish to 'turn up and travel' potentially for only a single ride.

If a single ride ticket is only a dollar or so, then if a regular prepaid payment card was issued, the cost of such regular payment card would represent a very significant proportion of the fare charged. This makes the issuance of such cards uneconomic for some applications and/or environments. A number of manufacturers, however, offer disposable cards that have a lower issuance cost and therefore may be more suitable for such applications and/or environments. Examples of such disposable fare media include the Mifare Ultralight® product from NXP Semiconductors (registered mark of NXP B.V., Private Limited Liability Company, High Tech Campus 60 NL-5656 AG EINDHOVEN NETHERLANDS); Innovision Research & Technology's Jewel product; the TOPAZ™ product of INNOVISION RESEARCH & TECHNOLOGY PLC (acquired by Broadcom Corporation, Irvine, Calif., USA); bar code cards (no chip, account number or the like encoded in a bar code); or even magnetic stripe cards (although the latter may be somewhat undesirable in some circumstances due to the wear induced in the readers as compared to the non-contact nature of bar code scanners). However such disposable fare media are not directly compatible with the open card payments infrastructure.

One or more embodiments provide techniques to address this incompatibility. In one or more embodiments, the card reader 132 (or other system component) performs a simple translation such that these existing disposable cards can form part of the fare media mix but that, from the perspective of the fare collection system, they can be handled the same way as if they were a credit, debit or prepaid card conforming to the standards of the global payments industry.

Exemplary standards include the aforementioned EMV standards and the MasterCard PayPass® M/Chip and MasterCard PayPass® Mag Stripe specifications. Significant aspects of the EMV standards include certain command sets and the ability to carry out offline data authentication via a cryptographic check to validate the card using public-key cryptography. There are three different processes that can be undertaken depending on the card: (1) static data authentication (SDA) ensures data read from the card has been signed by the card issuer; dynamic data authentication (DDA) provides protection against modification of data and cloning; and combined DDA/generate application cryptogram (CDA) combines DDA with the generation of a card's application cryptogram to assure card validity.

The cheaper cards (fare media) generally have two significant characteristics. They typically have fixed functions that cannot be configured to match the requirements of a specification such as EMV. They also typically do not have the capability to maintain as secret, such as a key, which would be usable to respond to a challenge. The more expensive cards (fare media), such as are typically used by EMV, have the ability to be configured to respond to commands that are defined in the EMV standard, and they also have the ability to maintain a secret internally, which can then be used to respond to a challenge (e.g., DES ('Data Encryption Standard'), triple-DES, RSA, and the like). By way of further explanation, EMV employs commands such as READ RECORDS, GET PROCESSING OPTIONS, and the like. More expensive cards can be configured to directly recognize those commands, by teaching the card the appropriate protocol or language. In the cheaper cards, only a fixed set of commands are available; these may not match the commands required by the applicable standard and/or specification (e.g., EMV). To summarize, the cheaper cards are limited to a fixed set of commands and are not programmable to respond to other commands, and the cheaper cards are generally unable to be configured to hold a secret and use the secret in a method defined by the applicable payment specification (e.g., EMV). Some of the cheap cards do have a form of capability to hold a secret, but in their own particular way, not in a way that is useful to EMV or the like.

It should be noted that in one or more embodiments, the interaction between the card and the reader is completely different than in current techniques. This is so because the use of the disposable fare media or the like requires that the process conform to the card's own command structure; furthermore, the disposable card is incapable of carrying out certain functions. Thus, it is not possible to simply replicate the standard EMV functionality with different commands.

Giving attention now to FIG. 7, an example will be given of a standard transaction (PAYPASS MAGSTRIPE PROFILE). In such a normal transaction, in a zeroth step (not illustrated), the reader 132 and card 112 (understood to include other kinds of devices, as well), establish communications. Note that reader 132 was discussed somewhat generically above, but in the context of FIG. 7 includes at least a contactless reader. In other cases, a contact reader can be provided. In a first step 301, the SELECT (PPSE) command allows the reader 132 to find out what payment applications the card has. This information is returned in the PAYPASS PAYMENT DIRECTORY in step 302. In step 303, the reader selects an appropriate one of the applications using the SELECT command with the appropriate application identifier (AID) as an argument. Step 304 includes the return of FCI—File Control Information from selecting Proximity Payment Systems Environment (PPSE). Step 306 includes the card responding to the select application command telling the reader the information that it needs for the transaction—AIP (Application Interchange Profile) tells the reader how to conduct the transaction, while AFL (application file locator) tells the reader what records need to be read from the card in order to conduct the transaction. It may also specify the PDOL—Processing Data Objects List, which is data that the card needs from the reader in order to conduct the transaction as defined immediately hereinafter for step 305. In step 305, if the card asked for any specific data in step 304, the reader sends it in step 305, via the GET PROCESSING OPTIONS command. This step "says" to the card "tell me the basic context for the transaction. What do I need to read from you and what process shall we use?" The various commands and arguments are familiar to the skilled artisan from the EMV, PAYPASS® M/CHIP® & PAYPASS® MAG STRIPE standards (registered marks of MasterCard International Incorporated, Purchase, N.Y., USA).

In steps 307, data is read from the card, using the READ RECORD command, in a manner well-known in the art. Step 308 shows return of the records that have been read.

In step 317, the reader provides an unpredictable number (UN) and asks the card to compute a cryptographic checksum. In step 318, the card responds with the track 1 CVC3(optional), the track 2 CVC3, and the Application Transaction Counter (ATC).

The process just described will now be reiterated and summarized. There is an initial exchange where the card and reader work out how to communicate and establish communication. Then, the application is selected at 303, wherein a "SELECT" command is sent from the reader to the card, giving the card the identity of the application the reader wants to select. The reader gets a response from the card at block 304 that says (the terms "say," "talk," and the like being understood to contemplate electronic communication), in essence, "here is a brief description of the card." The reader then sends the "GET PROCESSING OPTIONS" command to the card in step 305. This is, in colloquial terms, the reader saying to the card "I would like to conduct a transaction; let us work out the details of how we should proceed"; the reader says to the card "if you asked for any details to determine how we should communicate, here are those details," and the card says to the reader, in step 306, "here is the information that you need in order to know how to proceed with the transaction." The information basically tells the reader what to read from the card and what the context of the transaction is.

In step(s) 307, the reader takes from the card all of the information it needs, via a command called "READ RECORD." The data obtained includes the primary account number (PAN), expiry date, and track data. In some instances, the data obtained may also include a series of public key certificates that allow verification of the authenticity of the card's data and encryption of data sent to the card (e.g. a PIN entered into the reader by the cardholder for verification by the card).

In step 317, the reader provides an unpredictable number (UN) and asks the card to compute a cryptographic checksum.

Figure 7:
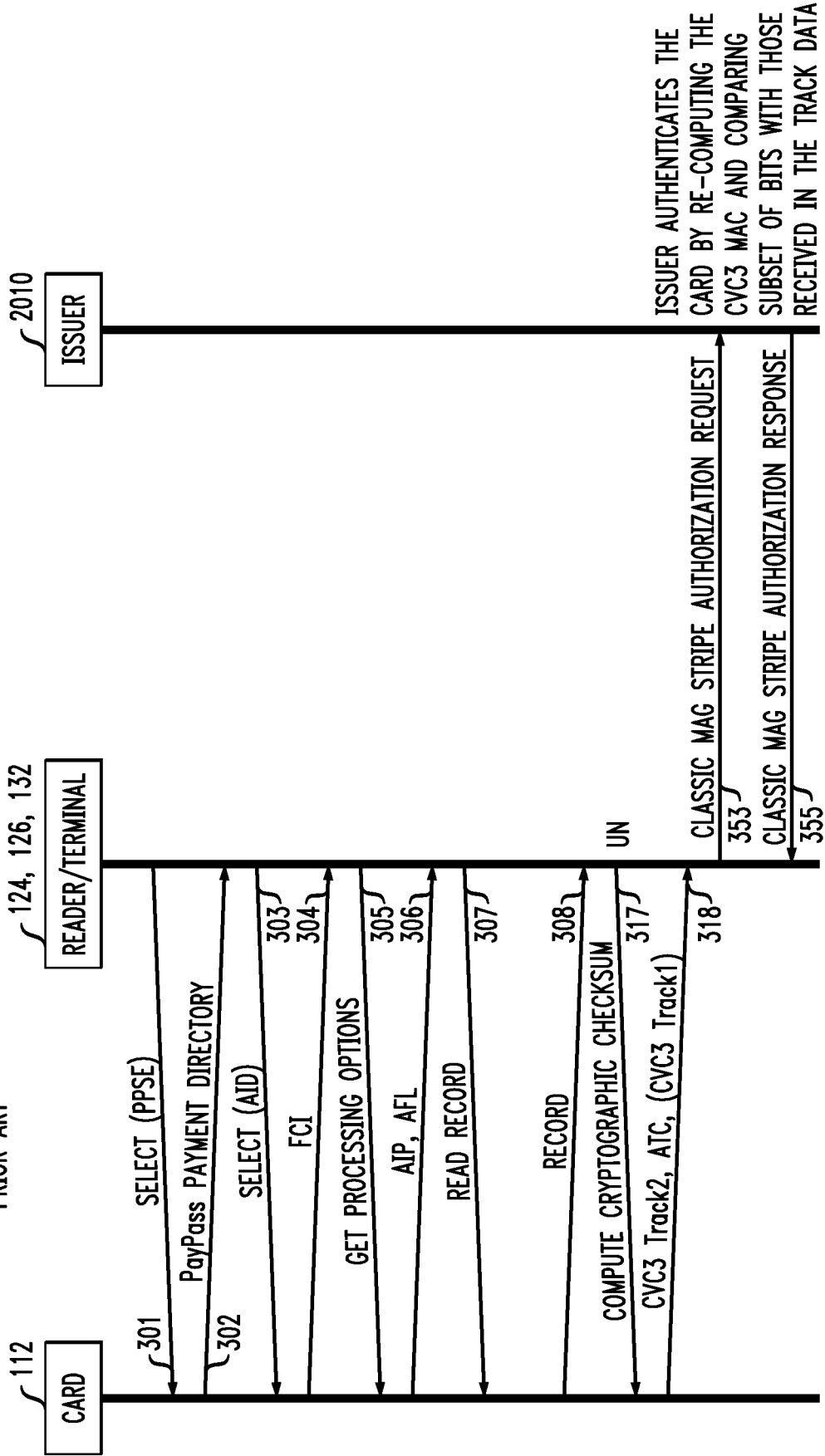
FIG. 7 is a message flow diagram depicting prior art techniques.

Still with reference to FIG. 7, the reader 132 and the terminal 124, 126 are depicted as a single entity in this instance.

The track 2 data, and the track 1 data if provided, are sent to the issuer 2010, as shown at 353, within a conventional magnetic stripe authorization request. The conventional magnetic stripe authorization response is depicted at 355. Note "Classic Mag Stripe" is intended as a non-limiting example of conventional magnetic stripe messaging.

Note also that examples are provided in the context of a contactless transaction but in other instances, embodiments may be implemented in the context of a contacted transaction.

The skilled artisan will appreciate that the CVC3 (card verification code) is a cryptographic checksum also known as a MAC. Typically, with a normal magnetic stripe transaction, it is a static three digits. In EMV, dynamic cryptographic checksums are employed due to their greater strength and the fact that they are not subject to replay attacks. In current PayPass® Mag Stripe products and services (see, e.g., FIG. 7), only selected bits from the CVC3 can be employed, inasmuch as additional data needs to be provided to the issuer, such as bits from the unpredictable number and the application transaction counter.

The skilled artisan will also appreciate that the application transaction counter (ATC) is a counter in the chip card, two bytes long, which increments every transaction, and is a fundamental security mechanism employed with both contacted and contactless chips. It is one wherein the card and issuer, by including the ATC in the cryptogram calculation, can ensure that a cryptogram (and associated data) validated by the issuer is not simply a copy of data used for another transaction. The ATC can also be helpful for low-level cryptographics, such as key derivation, and could in principle be used for detecting card clones irrespective of cryptography.

In addition, the skilled artisan will appreciate that the unpredictable number is a four-byte number which provides a way for the terminal to ensure that the transaction is not replayed but rather is fresh. It is part of what is known as a challenge and response protocol, wherein the terminal sends an unpredictable number to the card, and the card will include that number in its cryptogram, which is sent to the issuer. In parallel with that, the terminal sends the unpredictable number to the issuer, and the issuer uses same as part of verifying the cryptogram.

Figure 10:
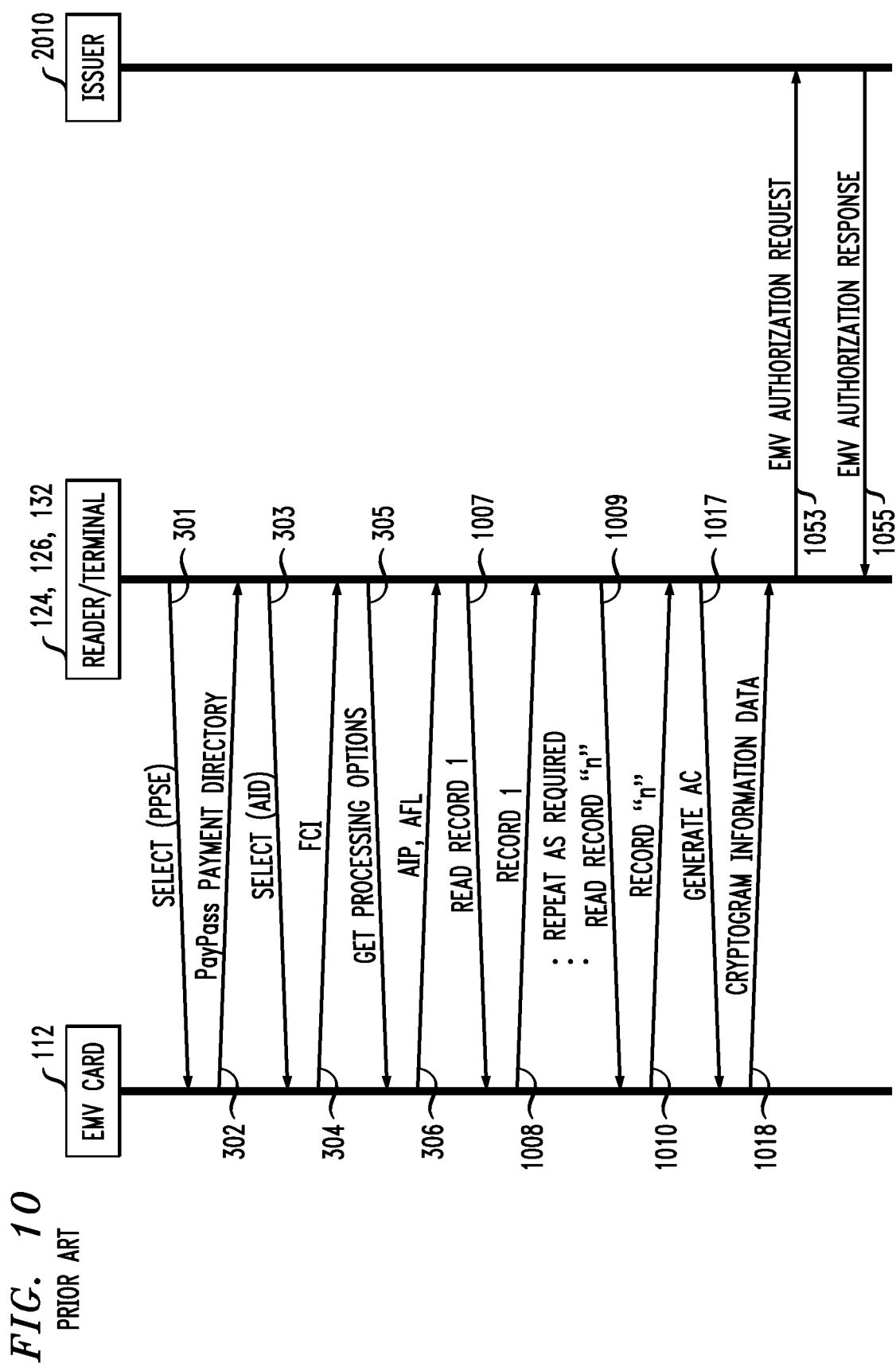
FIG. 10 is another message flow diagram depicting prior art techniques.

The ARQC is the EMV authorization request cryptogram, which is included in the authorization request sent to the issuer (see exemplary EMV flows in FIG. 10).

The authorization request may conform, for example, to the ISO 8583 standard (proprietary sub-elements may also be included in some cases, as will be appreciated by the skilled artisan).

One or more embodiments may be implemented in the context of MasterCard PayPass® Mag Stripe products and services. The skilled artisan will appreciate that the same enables emulation of a magnetic stripe transaction with a chip card, with little or no impact on a magnetic-stripe payment card network (other than a small amount of extra data, such as the aforementioned ten bytes). Thus, in one or more embodiments, a contactless "smart" card interacts with a reader, but messaging within the payment network is analogous to that in a conventional transaction wherein a card with a magnetic strip is "swiped."

The PayPass® Mag Stripe specifications allow contactless chip payments to use authorization networks (proprietary and shared) that presently support magnetic stripe authorizations for credit or debit applications. The chip authentication process is performed between the chip embedded in the PayPass card 112 and the issuer 2010, which means that the additional functionality required in terminals to support PayPass® Mag Stripe specifications is minimal. There is also little impact on the acquirer host system, the authorization network and on other entities that may be involved in the transaction.

In the PayPass® Mag Stripe specifications, the card stores track 1 and track 2 data and a secret key for device authentication. Security is built around a dynamic Card Validation Code (CVC3) included in the discretionary data field of the track data. The CVC3 is generated by the card using a diversified secret key and the following input data:
The track data,
The Application Transaction Counter (ATC) of the card, and
The Unpredictable Number (UN) provided by the reader.
The general principle of operation is as follows: a card generates an authentication token for the issuer in the form of a dynamic CVC (CVC3). The CVC3, the UN and (part of) the ATC are sent to the issuer in the discretionary data fields of the track 1 and track 2 data, requiring little or no modification to the acquirer systems and the networks that are presently used for magnetic stripe card authorizations.

The PayPass® Mag Stripe specification considers the reader to be a peripheral device of the terminal. The reader performs the interaction with the card. It should be noted that in some instances, the terminal and reader are integrated into a single point-of-sale (POS) device while in others, they may be separate.

By way of review, consider a transaction in accordance with the PayPass® Mag Stripe specification. In a first step, terminal 124, 126 enables reader 132. In a second step, reader 132 sends UN to card 112. In a third step, card 112 sends dynamic CVC3 and ATC to reader 132. In a fourth step, reader 132 sends Data Record to terminal 124, 126. In a fifth step, terminal 124, 126 sends authorization data to a host of acquirer 2006. In a sixth step, the host of acquirer 2006 sends an ISO 8583 type 100 message on payment network 2008 (e.g., the BANKNET network). In a seventh step, payment network 2008 forwards ISO 8583 type 100 message to issuer 2010. In an eighth step, issuer 2010 responds with an ISO 8583 type 110 message. In a ninth step, payment network 2008 forwards ISO 8583 type 110 message to acquirer 2006. In a tenth step, the host of acquirer 2006 informs terminal 124, 126 about the outcome of the transaction (e.g., approval). Again, in the simplified view of FIG. 7, the terminal and reader are collapsed into a single entity.

Thus, a PayPass® Mag Stripe transaction can include the following operations. The terminal enables the reader. The reader creates a list of applications that are supported by both the card and reader, as at 302. The reader picks the highest priority application from the list of mutually supported applications, and issues the SELECT command to select the application on the card, as at 303. The reader issues the GET PROCESSING OPTIONS command to initiate the transaction on the card, as at 305. The card updates the ATC. The reader issues the READ RECORD command to retrieve the static data from the card, as at 307. Amongst other data objects, the Track 1 Data (optional) and Track 2 Data and the bitmaps are returned. The bitmaps inform the reader where the CVC3, the ATC and the UN are to be located in the discretionary data fields of the Track 1 Data and Track 2 Data. The reader generates the UN and issues the COMPUTE CRYPTOGRAPHIC CHECKSUM command, in 317. The card returns the CVC3s for the Track 1 Data and Track 2 Data and the ATC, in 318.

Based on the bitmaps returned in the response 308 from the READ RECORD, the reader inserts the CVC3, (part of) the ATC and the UN in the discretionary data fields of the Track 1 Data and Track 2 Data. The reader copies the number of UN digits ($n_{UN}$) in the least significant position of the discretionary data fields of the Track 1 Data and Track 2 Data. The reader prepares a Data Record for the terminal. The Data Record includes the Track 1 Data (if present) and Track 2 Data including the dynamic CVC3 data. The Data Record also includes the discretionary data fields of the Track 1 Data (if present) and Track 2 Data as returned by the card (i.e. without UN, ATC, CVC3 and $n_{UN}$ included). The Data Record may also include PayPass Third Party Data (e.g. loyalty data returned by the card), card data for receipt printing (e.g. Application Label, Application Preferred Name and Issuer Code Table Index) and the cardholder's language preference (Language Preference).

The reader transfers the data objects of the Data Record required by the terminal to the terminal. Depending on the product rules, the terminal may request the cardholder to enter his or her PIN for online PIN processing or offline PIN processing (in which case the PIN is entered and sent to the card before the reader issues the COMPUTE CRYPTOGRAPHIC CHECKSUM command). The terminal formats the authorization request as for a magnetic stripe transaction and sends the authorization request to the issuer, as at 353. Upon receipt of the authorization request, the issuer verifies the CVC3 and processes the authorization in a similar way to a magnetic stripe card authorization, as at 355. Depending on the product rules, the terminal prints a receipt with a line for cardholder signature.

FIG. 10 shows another example of a standard transaction (CONTACTLESS EMV PROFILE SUCH AS PAYPASS M/CHIP PROFILE). In a first step 301, the SELECT (PPSE) command allows the reader 132 to find out what payment applications the card has. This information is returned in the PAYPASS PAYMENT DIRECTORY in step 302. In step 303, the reader selects an appropriate one of the applications using the SELECT command with the appropriate application identifier (AID) as an argument. Step 304 includes the return of FCI—File Control Information from selecting Proximity Payment Systems Environment (PPSE). Step 306 includes the card responding to the select application command telling the reader the information that it needs for the transaction—AIP (Application Interchange Profile) tells the reader how to conduct the transaction, while AFL (application file locator) tells the reader what records need to be read from the card in order to conduct the transaction. It may also specify the PDOL—Processing Data Objects List, which is data that the card needs from the reader in order to conduct the transaction as defined immediately hereinafter for step 305. In step 305, if the card asked for any specific data in step 304, the reader sends it in step 305, via the GET PROCESSING OPTIONS command. This step "says" to the card "tell me the basic context for the transaction. What do I need to read from you and what process shall we use?" Again, the various commands and arguments are familiar to the skilled artisan from the EMV, PAYPASS® M/CHIP® & PAYPASS® MAG STRIPE standards (registered marks of MasterCard International Incorporated, Purchase, N.Y., USA).

In step 1007, data (RECORD 1) is read from the card, using the READ RECORD 1 command, in a manner well-known in the art. Step 308 shows return of the data (RE-CORD 1) that has been read. This is repeated as required for "n" records, as indicated at READ RECORD "n" 1009 and RECORD "n" 1010.

In step 317, the reader issues the GENERATE AC command. In step 318, the card responds with cryptogram information data.

Still with reference to FIG. 10, the reader 132 and the terminal 124, 126 are depicted as a single entity in this instance.

The EMV authorization request is sent to the issuer 2010, as shown at 1053. The EMV authorization response is depicted at 1055.

Figure 11:
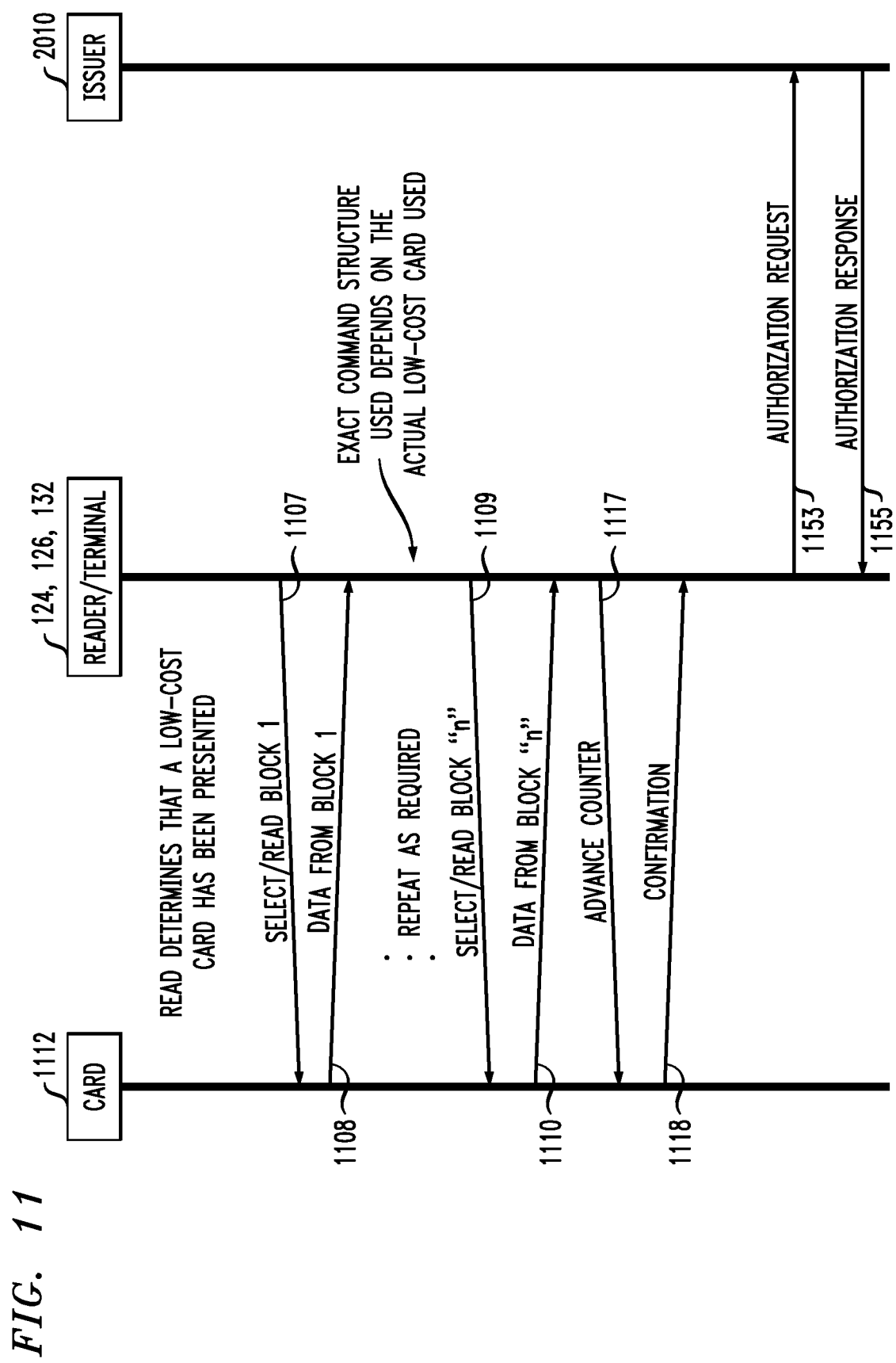
FIG. 11 is a message flow diagram depicting an exemplary technique, according to an aspect of the invention.

FIG. 11 is a message flow diagram depicting an exemplary technique, according to an aspect of the invention, employing a low cost memory card 1112 or similar device. Upon presentation, reader 132 determines that a low-cost card has been presented. At 1107, the reader 132 sends to the card 1112 a command to select and/or read block 1 (see discussion of blocks of data in example below). At 1108, the data from block 1 is returned form the card 1112 to the reader 132. This is repeated as required for "n" blocks, as indicated at SELECT/READ BLOCK "n" 1109 and DATA FROM BLOCK "n" 1110. At 1117, the reader sends to the card a command to advance the (transaction) counter, and at 1118, the card confirms to the reader that this has been done. The authorization request is sent to the issuer 2010, as shown at 1153. The authorization response is depicted at 1155. Note that the exact command structure used will be dependent on the actual card 1112 that is used. Please note, the authorization request may either be a classic magstripe auth request, or an EMV auth request. The authorization message type will be determined by the Acquirer (not shown in the diagrams) and the authorization infrastructure in the market where the terminal is located.

Figure 12:
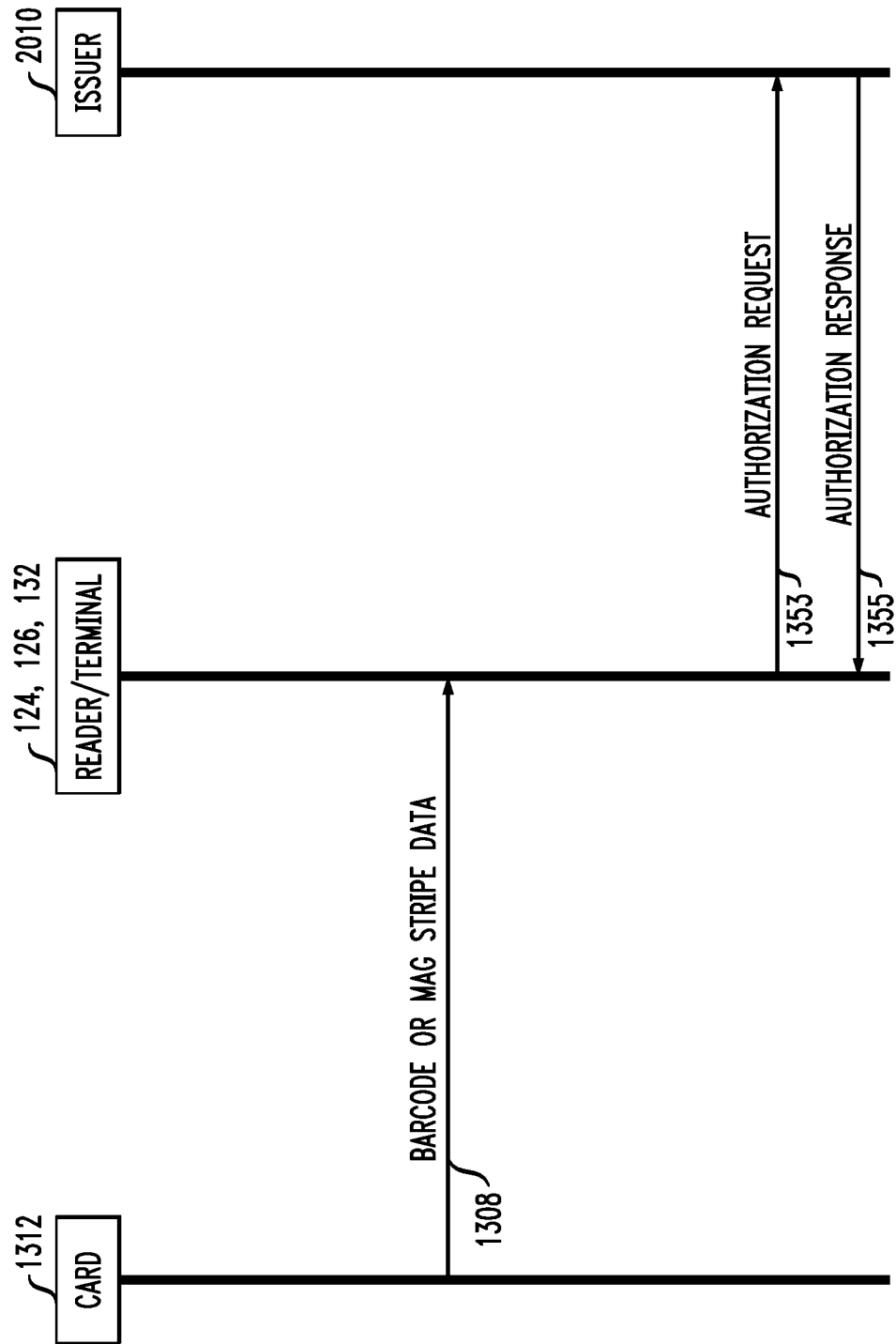
FIG. 12 is a message flow diagram depicting another exemplary technique, according to an aspect of the invention.

FIG. 12 is a message flow diagram depicting another exemplary technique, according to an aspect of the invention, employing a barcode or magnetic stripe card 1312 or similar device. At 1308, barcode or magnetic stripe data is sent to the reader/terminal 124, 126, 132 assembly. This occurs when the barcode is placed in proximity to the optical reader or when the magnetic stripe is swiped. The authorization request is sent to the issuer 2010, as shown at 1353. The authorization response is depicted at 1355. Please note, the authorization request may either be a classic magstripe auth request, or an EMV auth request. The authorization message type will be determined by the Acquirer (not shown in the diagrams) and the authorization infrastructure in the market where the terminal is located.

One or more embodiments advantageously provide for the integration of disposable media into the PayPass® acceptance environment or the like. Indeed, one or more embodiments provide a mechanism to allow the cost effective integration of disposable cards (low cost media) into a system designed to accept cards conforming to the global payments industry (e.g., EMV).

In this regard, although disposable cards do not conform to the standards set by the global payments industry, in one or more embodiments, the terminal, after reading the data from the card, creates a transaction which does conform to the standards. This approach then allows the transaction to be processed by the same systems that are used to support contactless payment cards conforming to the standards set by the global payments industry. It is therefore not necessary to operate a separate proprietary system to support these disposable cards.

It is significant to note that, although these cards appear as if they are a normal payment card within the environment supporting them, outside the environment they are not recognized as payment devices.

Advantageously, one or more embodiments can be used to support memory cards, or cards supporting only a barcode, if required, depending on the level of security required.

The following are two non-limiting exemplary ways in which such a solution can be implemented in accordance with one or more aspects of the invention:

1 Disposable medium is used as an access device to a prepaid account operated by a financial institution.
2 Disposable medium is used as a ticket (single journey, multiple journey or period pass), where no actual prepaid account exists.

For option 1 above, a financial institution sets up a prepaid account in the normal way, and when the account is activated, a balance is assigned to the account. This balance may be sufficient only for a single journey, or may be a nominal amount such as $5 US. Instead, however, of issuing a regular prepaid card, compliant with the MasterCard PayPass® standards or the like, the account number is encoded into a disposable medium which is then issued to the cardholder. When this disposable medium is presented to the ticket gate or barrier, the payment terminal recognizes the device as a disposable medium and reads the account number (plus any other information recorded on it). It then uses this data to populate either a PayPass® magnetic stripe profile or EMV profile transaction record (a template is used for this process). As part of the conversion process, the account number is converted to a PAN number using a prefix (bank identification number (BIN) range (BIN is also now known as IIN for issuer identification number)) that ensures it is routed to the correct issuer and that it can be identified as a special transaction when it hits the issuer's server.

As disposable media cannot generate the cryptographic information normally used to protect a payment transaction, the template defines an alternative security method. This can be, for example, a cryptogram generated by the terminal using the account number, other data recorded on the card, and the card's serial number. As many disposable cards are capable of supporting counters (one way), the ATC may also be populated using one of these counters, and the counter can then be advanced by the terminal.

The ticket barrier, after reading the data from the disposable medium, will then send it on for authorization as if it has undertaken a normal PayPass® transaction.

Figure 8:
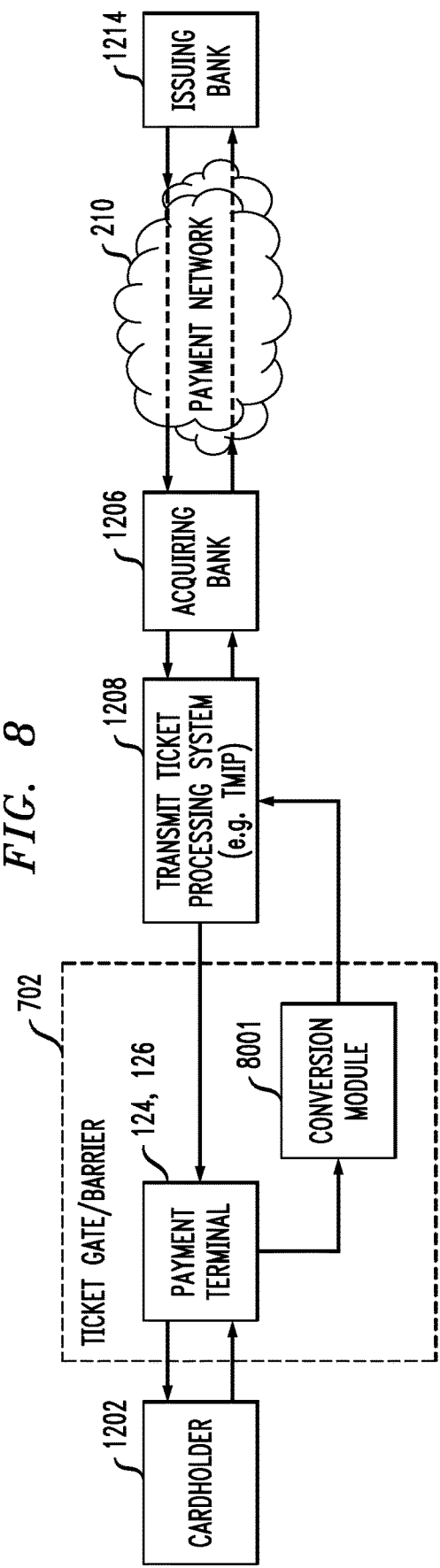
FIG. 8 is block diagram of a system according to an aspect of the invention.

Attention should now be given to FIG. 8. As seen therein, cardholder 1202 presents the card or other device (not shown) to the reader (part of payment terminal 124, 126 which is in turn part of the ticket gate/barrier assembly 702). The payment terminal identifies the card as a (low cost) memory card and instigates conversion module 8001 (conversion module 8001 can be, for example, software within the payment terminal). The conversion module takes data read from the card and converts it to an auth request identifying the card as a PayPass® card or the like. In one or more embodiments, the auth message will typically be a type 100 message as defined by ISO 8583.

An auth request is then routed to the acquiring bank 1206 or its processor; for example, via TMIP 1208 (the active file manager or MasterCard Interface Processor, when configured for a transit environment, may be referred to as a transit-MIP (TMIP)) or the like (more generically a transit ticket processing system). The auth request is then sent via payment network 210 to the issuing bank 1214 and the auth response is routed back over the payment networks from the issuer to the acquirer. In one or more embodiments, the auth message will typically be a type 110 message as defined by ISO 8583. The auth response is ultimately sent to the payment terminal or merchant payment systems to be processed as per the merchant's requirements.

The following are examples of significant data that may be used:

Encoded onto the card: Account number ->converted to PAN

Issue/expiry date ->used to populate template

Counter ->used to generate advancing ATC

As part of the security, the card's serial number, which is normally very difficult for an attacker to change, may also be used for calculating a cryptogram.

One advantage of this approach is that a prepaid card can be issued to cardholders only intending to use the card for a very limited time by using low cost media. Although this approach may not afford the same level of security as would be achieved with a standard payment card, in the context of many environments, where the use of the card is limited to only a single function, this may not represent a significant issue and the user may find it to be sufficient for the given application. The software required within the ticket gate is also very limited, as all security and payment logic remains largely 'standard' within the payment system. The approach therefore avoids operating a proprietary scheme to support low cost media.

With regard to Option 2, in transit applications, a regular Payment card (e.g., PayPass/EMV) may be used in some implementations as a reference or identification of the consumer to a ticket held by the transit operator's backend system. In one or more embodiments, lower-cost cards or devices are also employed for such reference or identification purposes.

In PayPass® systems, additional data can be added onto the card to allow certain simple functionality. For example, in the case of a one-day ticket, additional information can be written to the card so that the turnstile or other barrier immediately knows that it is not necessary to carry out a payment transaction, but that the PayPass® card in fact represents a one-day ticket. In one or more embodiments, lower-cost cards or devices, or even bar code cards, are provided with such additional information so that the turnstile or other barrier immediately knows that it is not necessary to carry out a payment transaction. In a typical application, a very large percentage of the users (say 70-90%) would be expected to have a high-end card such as a PayPass® card. However, there may be occasional riders for whom use of a PayPass® card is not economically viable, and who must be afforded access to the system for legal reasons.

The following co-assigned US patents and US Patent Publications are expressly incorporated herein by reference in their entireties for all purposes:

U.S. Pat. No. 7,374,082, APPARATUS AND METHOD FOR INTEGRATED PAYMENT AND ELECTRONIC MERCHANDISE TRANSFER

U.S. Pat. No. 7,681,788, APPARATUS AND METHOD FOR INTEGRATED PAYMENT AND ELECTRONIC MERCHANDISE TRANSFER;

US 2010-0252624 A1, APPARATUS AND METHOD FOR INTEGRATED PAYMENT AND ELECTRONIC MERCHANDISE TRANSFER; and US 2009-0103730 A1, APPARATUS AND METHOD FOR USING A DEVICE CONFORMING TO A PAYMENT STANDARD FOR ACCESS CONTROL AND/OR SECURE DATA STORAGE.

Option 2 describes, for example, how TMIP type functionality can be accommodated in a low-cost media environment. In one or more embodiments, the back-end systems function as they would for a high-end card or payment device, inasmuch as conversion module 8001 converts the data from the low-end card or payment device into data understandable by the existing back-end systems. It is worth noting that in one or more embodiments, a significant level of trust exists in the data generated by the conversion module because the same is operated by or on behalf of the transit agency or the like; i.e., there is no possibility of a "rogue merchant." That is to say, the low-end cards or payment devices might be risky if used generally at a variety of merchants (because a rogue merchant could inject rogue transactions into the system since with the lower-functionality cards, it would not be possible to verify that the card was actually present). However, because, in one or more embodiments, the low end cards or devices are issued by (or for) and controlled by (or for) the transit authority or the like, and usable only within the transit authority or the like, it is much safer to use them than in general use.

For Option 2 above, the solution may operate, for example, in one of the following ways:
  a) Ticket barrier/gate performs additional logic to confirm the validity of the ticket
  b) Ticket barrier/gate forwards the 'simulated' PayPass® transaction and the TMIP undertakes the logic to confirm the validity of the ticket.

Option 2a requires additional efforts to maintain the validity rules on every ticket barrier or gate, and additional data recoded on the low cost medium to allow this. However reconciliation and central monitoring may still be simplified significantly by using the PayPass® system to collate and monitor settlement records generated following each transaction. This reduces the need to have separate central systems to manage low cost media. If the rules are extremely simple, such as single journey and one day period passes, the logic on each ticket barrier or gate may not represent a significant overhead to maintain.

In some environments, the operator of the low cost closed loop scheme may not want to authorize every transaction. Instead the operator may want to operate a half way solution for their cheapest tickets, part stored value, part centrally controlled.

In such cases a device such as the Mifare Ultralight device may not offer sufficient security, and a slightly more secure device such as the Mifare Ultralight C could be used. This has some added security features including one way hardware counters, that can be configured with the number of journeys allowed. A date or range of dates could also be configured where travel is possible.

The solution is identical to that described elsewhere herein, apart from the fact that the terminal decides if the cardholder is allowed to enter the system (i.e. no auth message is sent). Transactions are stored on the terminal for communication at a later stage to the host system. In such a system, the issuer processor may ultimately process the transactions on behalf of the operator, but purely for record purposes (no actual issuer account, or actual money is involved as part of any transaction)

Option 2b allows the TMIP to be used without modification, as it just "sees" PayPass® transactions and is not aware that a low cost disposable medium has been presented. This allows any validity rules implemented within the TMIP (i.e. overlaid onto a normal payment card) to be used.

The TMIP concept uses the PAN number as a reference to a local account which may contain a session ticket. One or more embodiments are fully compatible with the TMIP solution, and provide a suitable way of implementing option 2 without needing to implement additional logic in each terminal.

Thus, by way of review, in a transit environment, there are a number of types of ticket which a consumer might purchase. Travel cards are quite common, especially in Europe. Travels cards might last, for example, a year, and give one a right to travel for one year on the transit system. In London, for instance, a one-year travel card is about £2000; say, roughly, $3000 US. Therefore, if the technology in the ticket, e.g., PayPass® technology, costs several dollars, this can easily be accommodated in the large value for which the ticket has been sold.

Even for, say, a month's ticket instead of a year's ticket (or even a week's ticket), the business case is still quite good. However, for a single journey; say a short bus trip of a couple of miles, which might be charged at, say, $1 US, then, if the ticket, or the technology therein, costs the supplier $2 US to buy, use of such ticket will result in a loss of money. On the other hand, if a traditional paper ticket issued, such as has heretofore been done for such low value trips, the transit system now must support two different ticket systems, namely, contactless PayPass® tap in/tap out technology for the higher valued tickets and paper technology (e.g., driver or conductor examines the ticket, or ticket has a magnetic stripe that must be fed into machine) for the lower valued tickets. This implies two sets of infrastructure, two sets of training, indeed two sets of everything; this can have a negative impact on the overall business case.

There have been a number of attempts in the smart card world to develop products which are designed for the very low cost end of the market. There is some PayPass® technology which costs in the ballpark of $1 US. Even so, for very cheap tickets, it is not economically viable to use it. However, that erodes the overall business case because you must now use two systems. The technology world has developed some products which are called disposable smart cards which are intended to have a price point of about $0.20 US. Heretofore, it has not been possible to use these low-end disposable smart cards as payment cards for lower value bus rides, several stops on the subway, etc.; their use has been limited to proprietary systems. Because the technology is so cheap, it has limited capabilities. However, PayPass® cannot run with this cheaper technology—it simply does not support the functionality needed to implement PayPass®, as large amounts of functionality were cut out to get the price down.

In one or more embodiments of the invention, the fact that the cheaper chips cannot carry out a PayPass® transaction is recognized. However, if another system is introduced—say, a closed loop scheme or the like, it would then be necessary to support two payment schemes in the transit system or similar environment. This might mean that the two payment schemes were supplied by two different suppliers, the cost was doubled, and so on. A significant aspect of one or more embodiments is to permit use of real PayPass® cards that work at PayPass® terminals and as per PayPass® technology defined in the MasterCard PayPass® specifications, as well as allowing use of cheaper media such as cheaper chip cards employing a completely different and simpler system. They will not be PayPass® cards, but rather a simpler closed private set-up. However, in one or more embodiments, what happens when they are tapped against a terminal in the transit system is that the terminal pretends to the system that it was a PayPass® transaction. The terminal takes the data off the card, optionally enters some dummy data into the transaction, and then sends that into the system as if it was a PayPass® transaction that took place.

In this way, other than needing a special program in, e.g., the reader, which recognizes not only PayPass® cards but also the special cheaper cards, the rest of the system only needs to work with PayPass® technology. Thus, the reader and/or terminal makes a conversion of a proprietary, closed, technology into the look and feel of an open-loop PayPass® transaction so that the entire rest of the transit system (e.g., back office, head office) can run using PayPass®, since it appears to these entities/elements like a PayPass® transaction and the necessity of supporting two completely separate systems is avoided. Thus, a conversion is done in the terminal that makes all transactions, regardless of whether they come from a real PayPass® card or one of these cheaper cards, appear to the rest of the system ("look and feel") like a PayPass® transaction. In this way, the transit operator need make only a single investment in the back-end systems, since the terminal, where the communication is done with the card, makes the conversion.

EXAMPLE

A non-limiting example will now be provided regarding how a solution works with Mifare Ultralight devices. It is to be understood that this is a non-limiting exemplary embodiment and the skilled artisan could replicate an equivalent solution on other platforms such as the Innovision Jewel, bar code, magnetic stripe, or the like.

The NXP Ultralight application note AN 073120 mifare Ultralight Features and Hints Rev. 2.0 18 Dec. 2006 (copyright NXP B.V.) is expressly incorporated herein by reference in its entirety for all purposes. The Mifare Ultralight has 16 pages (blocks) of 4 bytes as follows:

| Page 0 | UID | UID | UID | UID |
|---|---|---|---|---|
| Page 1 | UID | UID | UID | 00 |
| Page 2 | Internal | Internal | Lock Byte | Lock Byte |
| Page 3 | OTP (32 one time programmable bits) | | | |
| Page 4 | 4 Bytes of read/write user memory | | | |
| Page 5 | 4 Bytes of read/write user memory | | | |
| Page 6 | 4 Bytes of read/write user memory | | | |
| Page 7 | 4 Bytes of read/write user memory | | | |
| Page 8 | 4 Bytes of read/write user memory | | | |
| Page 9 | 4 Bytes of read/write user memory | | | |
| Page 10 | 4 Bytes of read/write user memory | | | |
| Page 11 | 4 Bytes of read/write user memory | | | |
| Page 12 | 4 Bytes of read/write user memory | | | |
| Page 13 | 4 Bytes of read/write user memory | | | |
| Page 14 | 4 Bytes of read/write user memory | | | |
| Page 15 | 4 Bytes of read/write user memory | | | |

Pages 0 and 1 contain the unique manufactures serial number (UID) for the device. Pages 4-15 contain a total of 48 bytes of user defined read/write memory.

The device can therefore be configured as follows as a simple online PayPass replacement device:

Page 4—8 numeric digits (4 bytes hexadecimal) account number

Page 5—start date and expiry date, recorded MMYYM-MYY as hexadecimal digits

Page 6 & 7—Cryptographic MAC covering pages 1, 2, 4 & 5 (the fixed Data)

Page 8 & 9—used as an advancing counter, encrypted using a 3DES (Triple-DES) key Pages 10-15—not used in this example.

Note, where supported, pages 4, 5, 6 and 7 are locked when originally personalized such that the data they contain cannot be changed.

As the device is essentially used only as a reference to an online account, similar to that of a PayPass magstripe profile device, the card does not need to hold any details of the 'value' held in the account. However, for security, it may be desirable to prevent the following types of attack:

1. The card being duplicated or modified (cardholder fraud)
2. Fake transactions being generated (Merchant fraud)

Given that one or more embodiments are designed for use only within a closed environment, the second attack (merchant fraud) is not considered applicable as the merchant would only be defrauding themselves.

The use of the UID in the MAC (cryptographic seal) is designed to prevent an attacker creating a duplicate (or fake) card. The UID is written into the card by the chip manufacturer and therefore is difficult manipulate (change).

As the low cost card does not contain a secret key for the generation of a dynamic cryptogram, it is far less secure than a normal PayPass card; however within a closed environment such as a transit environment, this may not be considered a significant risk as there are many other ways to defraud the system (e.g. just not purchasing a ticket).

Figure 13:
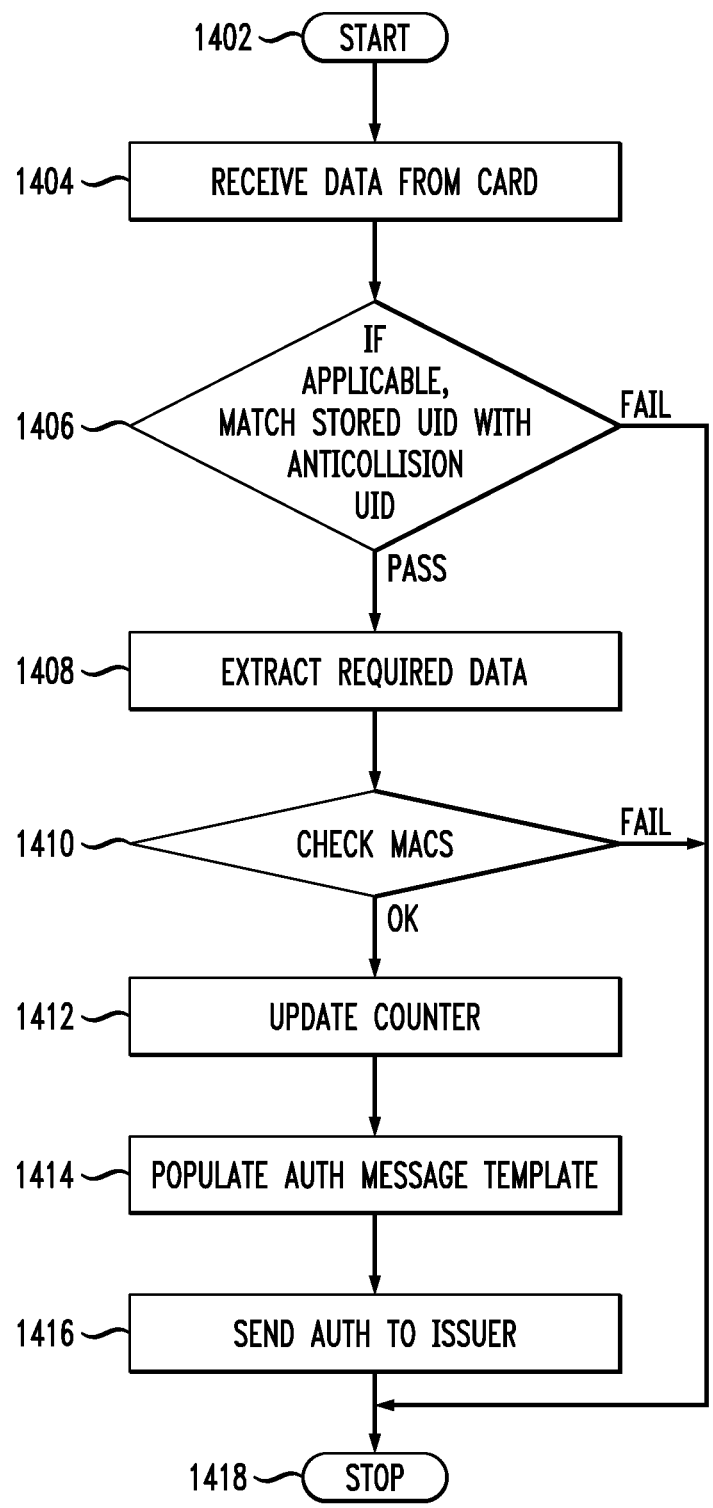
FIG. 13 is a flow chart of exemplary method steps, according to an aspect of the invention.

An example flow of a transaction using the low cost card is shown in the flow chart of FIG. 13, which begins at 1402. In 1404, receive data from the card.

Depending on the type of card actually used, it may be possible to detect that it is a low cost card from the configuration bits read during the card selection (anti-collision) process (well-known to the skilled artisan, in and of itself, from ISO/IEC 14443 part 3 of 4; given the teachings herein, the skilled artisan will be able to adapt same to implement one or more embodiments). In other cases, when the terminal attempts to start a normal PayPass transaction it will fail, and logic on the terminal will then attempt to perform a low cost card transaction instead.

In 1406, if applicable, match the stored UID with the anti-collision UID. In this regard, where a static UID (some cards use random values) is used during the card selection (anti-collision) process, for added security this value is recorded by the terminal and then checked against the UID available from the device's memory (page 0 and 1 in the case of Mifare Ultralight). Although it is relatively straightforward for someone skilled in the art, with the necessary tools, to simulate a card at the application layer (after device selection), the anti-collision phase is normally controlled at a much lower level, and cannot therefore be simulated from the application layer. This provides some level of additional security, as many of the tools that might otherwise be used (programmable Java or MULTOS cards) cannot be configured to use a user selectable LTID during the anti-collision phase. Refer to the "PASS" branch of block 1406. On the other hand, if the match fails, proceed to block 1418 and stop the process.

As shown at step 1408, using the appropriate command protocol (READ in the case of Mifare Ultralight), the data can be read from the device (in this example, pages 0, 1, 4, 5, 6, 7, 8 and 9). Referring to step 1410, a checksum is then calculated over pages 0, 1, 4 and 5, this is checked against the checksum stored in the MAC (page 6 and 7) by decrypting the MAC using asymmetric cryptography (e.g. RSA) to recover the previously calculated checksum. By using asymmetric cryptography, the keys required to generate a MAC can remain totally secret, and do not need to be distributed to the terminals.

If the calculated checksum matches the one previous stored on the card, then there is a reasonable level of confidence that the card is not a duplicate, and that the data has not been modified. This is shown at the "OK" branch of step 1410. If the match fails, proceed to block 1418 and stop the process.

Refer to step 1412. The advancing counter is then decrypted using a 3DES key held by the terminal, diversified using the UID. This is then incremented by 1, re-encrypted and written back to the card. It should be noted that it is possible that the 3DES key could be compromised if an attacker had sufficient access to a terminal containing it, however it does provide one additional security layer, increasing the cost and effort necessary to compromise the solution.

The account number, decrypted advancing counter, and start/expiry dates are then copied into a pre-defined authorization request message template, in step 1414. Some data format conversion may be required depending on exactly how the data was stored on the low cost card. This populated template is then sent to the issuer for authorization in step 1416. As noted, the process stops at 1418.

Note, in one or more embodiments, within the template, all other data elements are static values. The PAN number is formed from a pre-set header (typically the BIN range plus a few digits of the account number) plus the account number recovered from the card. The pre-set BIN ensures that the transaction is always routed to the correct issuer who is supporting the closed loop scheme.

The issuer should configure its authorization system as follows:

1. Only to accept these transactions from a defined acquirer and/or merchant (i.e. the closed loop system)
2. To ignore the cryptogram in the authorization request (it will just be a fixed value set by the template)

As an alternative, the terminal can generate the cryptogram to populate the authorization template; it requires the necessary master secret key—normally a diversified key is stored within each PayPass card. This means that that key used can no longer be considered secure (it must be shared with every terminal), however it does mean that change 2 above to the issuer's system is not required.

Recapitulation

Given the discussion thus far, it will be appreciated that, in general terms, an exemplary method, according to an aspect of the invention, includes the step (e.g., 1404) of obtaining, at a terminal assembly 124, 126 associated with a physical access point 702, payment device data from a reduced-functionality payment device. This step can be carried out, for example, by payment device-reader module interaction (as appropriate depending on whether a wireless device, bar code device, or magnetic stripe device). A further step includes identifying the payment device data as emanating from the reduced-functionality payment device (for example, as discussed elsewhere herein, by detecting failure to interact with the reduced-functionality payment device in accordance with the payment infrastructure or based on configuration bits read during a card selection process). A still further step includes, responsive to the identifying step, converting the payment device data emanating from the reduced-functionality payment device into one of an authorization request and an access request. The one of an authorization request and an access request is of a format consistent with full-functionality payment devices. This step can be carried out with conversion module 8001. A still further step includes dispatching the one of an authorization request and an access request into a payment infrastructure which is configured to handle the one of an authorization request and an access request of the format consistent with the full-functionality payment devices, but is not configured to handle the reduced-functionality payment device. In the case of an authorization request, this step could be carried out by the terminal assembly communicating with a payment network such as in FIG. 3. In the case of an access request, this step could be carried out by the terminal assembly communicating with an active file manager, or by internal checking.

In one or more embodiments, the payment infrastructure has a predefined command structure and the full-functionality payment devices are configured to maintain a key to respond to a challenge, while the reduced-functionality payment device has fixed functions not compatible with the predefined command structure of the payment infrastructure and is not configured to maintain the key to respond to the challenge.

As noted, the dispatching can include dispatching an authorization request to an issuer; in such cases, a further step includes obtaining an authorization response to the authorization request. See, e.g., 1153, 1155.

As noted, the dispatching can include dispatching an access request to an active file manager; in such cases, a further step includes obtaining a response to the access request (e.g., active file manager allows or denies access).

As noted, the dispatching can include dispatching an access request for local decisioning within the terminal assembly; in such cases, a further step includes obtaining a response (e.g., internally) to the access request.

In one or more instances, the physical access point is associated with one of a system (e.g., transit system) and a facility (e.g., venue for a festival). The full-functionality payment devices are configured to function generally for payment outside the one of a system and a facility, while the reduced-functionality payment device is not recognizable for payment outside the one of a system and a facility.

In some cases, the reduced-functionality payment device is a low-cost chip card having a memory; in other cases, the reduced-functionality payment device is a bar-code card; in still other cases, the reduced-functionality payment device is a magnetic stripe card.

In one or more embodiments, the dispatching includes, as at 1416, dispatching an authorization request to an issuer to access a prepaid account; and the reduced-functionality payment device is a low-cost chip card having a memory and having an account number encoded therein. The account number is incompatible with the payment infrastructure. Further steps include converting the account number to a PAN compatible with the payment infrastructure; generating a cryptogram at the terminal; and generating the authorization request using the PAN and the cryptogram generated at the terminal.

In some cases, the cryptogram is generated based on the account number, and possibly also based on a master secret key as described elsewhere herein.

In some embodiments, a further step includes sending, from the terminal assembly to the reduced-functionality payment device, a command to advance a counter thereof. See step 1412 and commands 1117, 1118.

As noted, in some cases, the issuer configures an authorization system to accept transactions originating from the reduced functionality payment device only from a defined acquirer and/or a defined merchant. In some instances, the issuer configures the authorization system to ignore any cryptogram in the authorization request.

In one or more embodiments, a further step includes operating a physical barrier (e.g., turnstile in 702) associated with the physical access point in accordance with the response to the authorization request or access request.

In another aspect, a terminal assembly associated with a physical access point includes a memory; and at least one processor, coupled to the memory. The at least one processor is operative to carry out any one, some, or all of the method steps described herein. For example, the at least one processor could be operative to obtain, at the terminal assembly associated with the physical access point, payment device data from a reduced-functionality payment device; identify the payment device data as emanating from the reduced-functionality payment device; responsive to the identifying, convert the payment device data emanating from the reduced-functionality payment device into one of an authorization request and an access request, the one of an authorization request and an access request being of a format consistent with full-functionality payment devices; and dispatch the one of an authorization request and an access request into a payment infrastructure which is configured to handle the one of an authorization request and an access request of the format consistent with the full-functionality payment devices, but is not configured to handle the reduced-functionality payment device.

In some cases, the assembly further comprises a distinct software module embodied in a non-transitory manner on a computer readable storage medium accessible to the memory, which when loaded into the memory configures the at least one processor to be operative to convert the payment device data (i.e., implementing the conversion module 8001).

System and Article of Manufacture Details

Embodiments of the invention can employ hardware and/or hardware and software aspects. Software includes but is not limited to firmware, resident software, microcode, etc. Software might be employed, for example, in connection with one or more of a TMIP 1208; a payment platform 704; an issuer MIP 1212; a terminal 122, 124, 125, 126; a reader 132; a host, server, and/or processing center 140, 142, 144 (optionally with data warehouse 154) of a merchant, issuer, acquirer, processor, or operator of a network 2008 operating according to a payment system standard (and/or specification); and the like. Firmware might be employed, for example, in connection with payment devices such as cards 102, 112, as well as reader 132.

Figure 9:
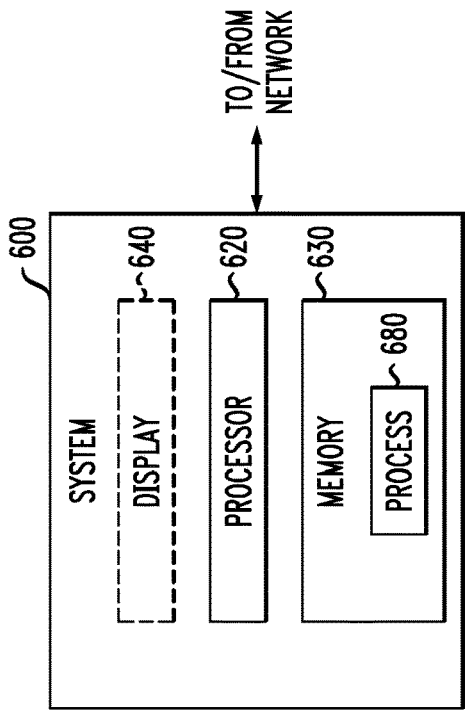
FIG. 9 is a block diagram of an exemplary computer system useful in one or more embodiments of the invention.

FIG. 9 is a block diagram of a system 600 that can implement part or all of one or more aspects or processes of the invention. As shown in FIG. 9, memory 630 configures the processor 620 (which could correspond, e.g., to processor portions 106, 116, 130; a processor of a terminal or a reader 132; processors of remote hosts in centers 140, 142, 144; processors of hosts and/or servers implementing various functionality; a processor of a TMIP 1208; a processor of a payment platform 704; a processor of an issuer MIP 1212 and the like) to implement one or more aspects of the methods, steps, and functions disclosed herein (collectively, shown as process 680 in FIG. 9). Different method steps can be performed by different processors. The memory 630 could be distributed or local and the processor 620 could be distributed or singular. The memory 630 could be implemented as an electrical, magnetic or optical memory, or any combination of these or other types of storage devices (including memory portions as described above with respect to cards 102, 112). It should be noted that if distributed processors are employed, each distributed processor that makes up processor 620 generally contains its own addressable memory space. It should also be noted that some or all of computer system 600 can be incorporated into an application-specific or general-use integrated circuit. For example, one or more method steps could be implemented in hardware in an ASIC rather than using firmware. Display 640 is representative of a variety of possible input/output devices (e.g., displays, printers, keyboards, mice, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is intended to encompass a recordable medium (non-transitory storage), examples of which are set forth above, but is not intended to encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 122, 124, 125, 126, 140, 142, 144, 132, 2004, 2006, 2008, 2010, 1208, and the like, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention, such as, for example, 122, 124, 125, 126, 140, 142, 144, 132, 2004, 2006, 2008, 2010, 1208, and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 600 as shown in FIG. 9) running a server program. It will be understood that such a physical server may or may not include a display, keyboard, or other input/output components. A "host" includes a physical data processing system (for example, system 600 as shown in FIG. 9) running an appropriate program.

Furthermore, it should be noted that any of the methods described herein can include an additional step of providing a system comprising distinct software (broadly construed in this context to be inclusive also of firmware) modules embodied on one or more tangible computer readable storage media. All the modules (or any subset thereof) can be on the same medium, or each can be on a different medium, for example. The modules can include any or all of the components shown in the figures. In one or more embodiments, the modules include a reader module, a terminal module, and a conversion module. The reader module could run on the processor(s) of a reader and the terminal module and conversion module could run on the processor(s) of a terminal. In the case of an integrated terminal assembly, the reader, terminal, and conversion modules could run on the same or different processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. The skilled artisan will appreciate from the context whether a "reader module," "terminal module," or "conversion module" is referring to software and/or firmware stored in a non-transitory manner in a tangible storage medium, or to a complete device (e.g., for a reader, contacts, antennas, and so on).

Computers discussed herein can be interconnected, for example, by one or more of network 138, 2008, another virtual private network (VPN), the Internet, a local area and/or wide area network (LAN and/or WAN), via an EDI layer, and so on. The computers can be programmed, for example, in compiled, interpreted, object-oriented, assembly, and/or machine languages, for example, one or more of C, C++, Java, Visual Basic, COBOL, Assembler, and the like (an exemplary and non-limiting list), and can also make use of, for example, Extensible Markup Language (XML), known application programs such as relational database applications, spreadsheets, and the like. The computers can be programmed to implement the logic depicted in the figures. In some instances, messaging and the like may be in accordance with the International Organization for Standardization (ISO) Specification 8583 *Financial transaction card originated messages—Interchange message specifications* and/or the ISO 20022 or UNIFI Standard for Financial Services Messaging, also incorporated herein by reference in its entirety for all purposes.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising the steps of:
obtaining, by at least one processor at a terminal assembly associated with a physical access point, payment device data from a reduced-functionality payment device;
said at least one processor identifying said payment device data as emanating from said reduced-functionality payment device;
responsive to said identifying step, said at least one processor converting said payment device data emanating from said reduced-functionality payment device into one of an authorization request and an access request, said one of an authorization request and an access request being of a format consistent with full-functionality payment devices; and
said at least one processor dispatching said one of an authorization request and an access request into a payment infrastructure which is configured to handle said one of an authorization request and an access request of said format consistent with said full-functionality payment devices, but is not configured to handle said reduced-functionality payment device;
wherein:
in said dispatching step, said payment infrastructure has a predefined command structure and said full-functionality payment devices are configured to maintain a key to respond to a challenge;
in said obtaining step, said reduced-functionality payment device has fixed functions not compatible with said predefined command structure of said payment infrastructure and is not configured to maintain said key to respond to said challenge;
said dispatching comprises dispatching an authorization request to an issuer to access a prepaid account; and
in said obtaining step, said reduced-functionality payment device comprises a low-cost chip card having a memory and having an account number encoded therein, said account number being incompatible with said payment infrastructure;
further comprising:
converting said account number to a PAN compatible with said payment infrastructure;
generating a cryptogram at said terminal; and
generating said authorization request using said PAN and said cryptogram generated at said terminal.

2. The method of claim 1, wherein said dispatching comprises dispatching an authorization request to an issuer.

3. The method of claim 2, further comprising obtaining an authorization response to said authorization request.

4. The method of claim 1, wherein said dispatching comprises dispatching an access request to an active file manager.

5. The method of claim 4, further comprising obtaining a response to said access request.

6. The method of claim 1, wherein said dispatching comprises dispatching an access request for local decisioning within said terminal assembly.

7. The method of claim 6, further comprising obtaining a response to said access request.

8. The method of claim 1, wherein:
said physical access point is associated with one of a system and a facility;
in said dispatching step, said full-functionality payment devices are configured to function generally for payment outside said one of a system and a facility; and
in said obtaining step, said reduced-functionality payment device is not recognizable for payment outside said one of a system and a facility.

9. The method of claim 1, wherein, in said obtaining step, said reduced-functionality payment device comprises a low-cost chip card having a memory.

10. The method of claim 1, wherein, in said obtaining step, said reduced-functionality payment device comprises a bar-code card.

11. The method of claim 1, wherein, in said obtaining step, said reduced-functionality payment device comprises a magnetic stripe card.

12. The method of claim 1, wherein said generating of said cryptogram comprises generating said cryptogram based on said account number.

13. The method of claim 12, wherein said generating of said cryptogram further comprises generating said cryptogram based on a master secret key.

14. The method of claim 1, further comprising sending from said terminal assembly to said reduced-functionality payment device a command to advance a counter thereof.

15. The method of claim 1, wherein said identifying comprises detecting failure to interact with said reduced-functionality payment device in accordance with said payment infrastructure.

16. The method of claim 1, wherein said identifying is carried out based on configuration bits read during a card selection process.

17. The method of claim 1, wherein said dispatching comprises dispatching an authorization request to an issuer to access a prepaid account, further comprising said issuer configuring an authorization system of said issuer to accept transactions originating from said reduced functionality payment device only from at least one of a defined acquirer and a defined merchant.

18. The method of claim 17, further comprising said issuer configuring said authorization system configure its authorization system to ignore any cryptogram in said authorization request.

19. The method of claim 1, further comprising operating a physical barrier associated with said physical access point in accordance with a response to said one of an authorization request and an access request.

* * * * *